(12) United States Patent
Saund et al.

(10) Patent No.: US 9,070,289 B2
(45) Date of Patent: Jun. 30, 2015

(54) SYSTEM AND METHOD FOR DETECTING, TRACKING AND ESTIMATING THE SPEED OF VEHICLES FROM A MOBILE PLATFORM

(71) Applicant: Palo Alto Research Center Incorporated, Palo Alto, CA (US)

(72) Inventors: Eric Saund, San Carlos, CA (US); Christopher Paulson, Livermore, CA (US); Gregory Burton, Mountain View, CA (US); Eric Peeters, Fremont, CA (US)

(73) Assignee: Palo Alto Research Incorporated, Palo Alto, CA (US)

( * ) Notice: Subject to any disclaimer, the term of this patent is extended or adjusted under 35 U.S.C. 154(b) by 58 days.

(21) Appl. No.: 13/891,765

(22) Filed: May 10, 2013

(65) Prior Publication Data

US 2014/0336848 A1 Nov. 13, 2014

(51) Int. Cl.
*G08G 1/054* (2006.01)
*G08G 1/017* (2006.01)

(52) U.S. Cl.
CPC .............. *G08G 1/054* (2013.01); *G08G 1/0175* (2013.01); *B64C 2201/127* (2013.01)

(58) Field of Classification Search
CPC ...... G08G 1/056; G08G 1/054; G08G 1/0175
USPC .................. 701/117, 119; 340/936, 937, 436
See application file for complete search history.

(56) References Cited

U.S. PATENT DOCUMENTS

| | | | |
|---|---|---|---|
| 6,526,156 B1 | 2/2003 | Black et al. | |
| 6,954,544 B2 | 10/2005 | Jepson et al. | |
| 7,058,205 B2 | 6/2006 | Jepson et al. | |
| 7,150,430 B2 * | 12/2006 | Silansky et al. | 244/30 |
| 7,566,177 B2 * | 7/2009 | Thompson | 396/427 |
| 7,765,062 B2 * | 7/2010 | Ariyur et al. | 701/519 |
| 8,244,469 B2 * | 8/2012 | Cheung et al. | 701/519 |
| 8,379,926 B2 * | 2/2013 | Kanhere et al. | 382/104 |
| 8,699,748 B2 * | 4/2014 | Huang et al. | 382/103 |

(Continued)

OTHER PUBLICATIONS

Kalal et al., "Tracking-Learning-Detection", IEEE Transactions on Pattern Analysis and Machine Intelligence, vol. 6, No. 1, Jan. 2010, pp. 1-14.

(Continued)

*Primary Examiner* — Thomas G Black
*Assistant Examiner* — Peter D Nolan
(74) *Attorney, Agent, or Firm* — Fay Sharpe LLP

(57) ABSTRACT

A method and system for measurement of ground based vehicle speed includes a movable platform that includes an unmanned aerial vehicle (UAV) located in proximity to a roadway, the UAV operates under control and navigation of a UAV control unit, and the UAV also carries camera and monitoring equipment, the camera and monitoring equipment including an onboard computing system, and a camera with a wide angle lens and a camera with a telephoto lens, the cameras being mounted on a pan/tilt device. An algorithm operated by the on-board computing system is used to detect and track vehicles moving on a roadway. The algorithm is configured to detect and track the vehicles despite motion created by movement of the UAV. The cameras mounted on the pan/tilt device are moved under the direction of the computer vision algorithm to maintain a target vehicle of the detected moving vehicles in view, and the speed of the target vehicle is measured.

19 Claims, 19 Drawing Sheets

(56) References Cited

U.S. PATENT DOCUMENTS

| | | | |
|---|---|---|---|
| 2010/0250022 A1* | 9/2010 | Hines et al. | 701/2 |
| 2011/0164108 A1* | 7/2011 | Bates et al. | 348/36 |
| 2011/0211084 A1* | 9/2011 | Sturzel | 348/211.99 |
| 2012/0133778 A1* | 5/2012 | Shih et al. | 348/169 |

OTHER PUBLICATIONS

Calonder et al., "BRIEF: Binary Robust Independent Elementary Features", CVLab, EPFL Lausanne, Switzerland, 2010, 14 pages.

Puri, "A Survey of Unmanned Aerial Vehicles (UAV) for Traffic Surveillance", Dept. of Computer Science and Eng'g, Univ. of So. Florida, 29 pages, 2004 (cited in Puri, "Statistical Profile Generation of Real-Time UAV-Based Traffic Data", 2008).

Wang et al., "Layered Representation for Motion Analysis", M.I.T. Media Laboratory Vision and Modeling Group, Technical Report No. 221, Apr. 1993, pp. 1-6.

Pundlik et al., "Motion Segmentation at Any Speed", British Machine Vision Conference (BMVC), Edinburgh, Scotland, Sep. 2006, 10 pages.

Puri, "Statistical Profile Generation of Real-Time UAV-Based Traffic Data", University of South Florida, Scholar Commons, 2008, pp. 1-108.

Liu, et al., "I-Brief: A Fast Feature Point Descriptor With More Robust Features", IEEE, 2011 Seventh Int'l Conf. on Signal Image Tech. & Internet-Based Systems, Nov. 2011, pp. 322-328.

* cited by examiner

SYSTEM AND METHOD FOR DETECTING, TRACKING AND ESTIMATING THE SPEED OF VEHICLES FROM A MOBILE PLATFORM

INCORPORATION BY REFERENCE

The following co-pending and commonly assigned application, the disclosure of which is being totally incorporated herein by reference, is mentioned: U.S. patent application Ser. No. 13/891,653 (now U.S. Published Application No. US-2014-033466-A1)filed May. 10, 2013 entitled "System and Method for Visual Motion Based Object Segmentation and Tracking", by Saund et al.

BACKGROUND

This application pertains to camera based analysis of road traffic. An existing issue is to detect a moving vehicle, measure its speed, and track the vehicle to capture an image of the vehicle's license plate. This is desired to be done from a mobile camera platform which is nominally an Unmanned Aerial Vehicle, however it is to be appreciated that other camera platforms are considered as well.

Multiple ground-based technologies are available for detecting traffic law violations such as speeding, unsafe lane changes, running red lights, illegal turns, etc. Human operated speed detection is commonly accomplished by following an offending vehicle through vehicle-mounted and hand-held radar. In another area automated technology exists for detecting red-light running. This may use a combination of road sensors and cameras affixed to poles near an intersection. Automated speed violation detection may also be accomplished by using a combination of radar and fixed cameras, or by cameras alone if calibrated.

Air-based detection of unsafe driving and especially speeding is done using human visual monitoring from an aircraft. A suspect vehicle must be tracked for sufficient distance to establish speed by the timing of the vehicle passing calibrated landmarks.

Modern autonomous unmanned aircraft routinely can navigate via Global Positioning System (GPS). UAVs are routinely fitted with still and video cameras that are capable of recording images and transmitting live video feeds to ground stations.

The University of Florida has investigated traffic monitoring with high end military UAVs, however, they were focused on traffic density measurements and not enforcement related activities.

Military UAVs have been equipped with pan/tilt cameras.

Various computer vision algorithms have been developed for appearance-based tracking of objects in scenes. These algorithms do not detect moving objects directly. They require initialization of the target object, and once the target object has been initialized, the target object is tracked through time. An example of such a concept is discussed in Zdenek Kalal, K. Mikolajaczyk, and J. Matas, "Tracking-Learning-Detection," Pattern Analysis and Machine Intelligence, 2011.

Various computer vision algorithms have been developed for detecting and tracking multiple moving objects in scenes of traffic from a stationary platform, where the object(s) to be tracked are determined automatically by their motion relative to the fixed scene. An example of the foregoing concepts is discussed in S. J. Pundlik and S. T. Birchfield, "Motion Segmentation at Any Speed," Proceedings of the British Machine Vision Conference (BMVC), Edinburgh, Scotland, pages 427-436, September 2006.

BRIEF DESCRIPTION

A method and system for measurement of ground based vehicle speed includes a movable platform that includes an unmanned aerial vehicle (UAV) located in proximity to a roadway, the UAV operates under control and navigation of a UAV control unit, and the UAV also carries camera and monitoring equipment, the camera and monitoring equipment including an onboard computing system, and a camera with a wide angle lens and a camera with a telephoto lens, the cameras being mounted on a pan/tilt device. An algorithm operated by the on-board computing system is used to detect and track vehicles moving on a roadway. The algorithm is configured to detect and track the vehicles despite motion created by movement of the UAV. The cameras mounted on the pan/tilt device are moved under the direction of the computer vision algorithm to maintain a target vehicle of the detected moving vehicles in view, and the speed of the target vehicle is measured. The method and system thereby allows for tracking a target vehicle to capture a license plate image with the telephoto lens.

DETAILED DESCRIPTION

Figure 1:
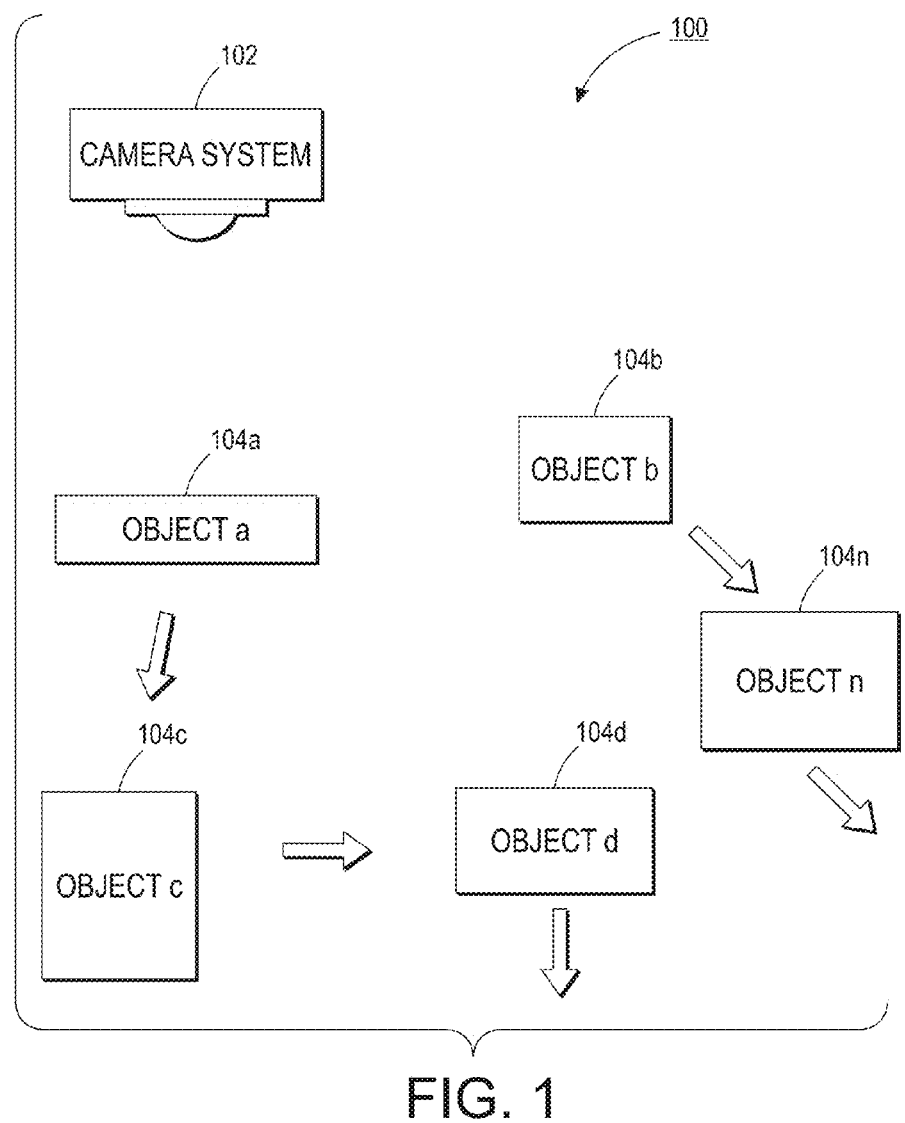
FIG. 1 illustrates an environment in which the present concepts may be employed.

FIG. 1 is a block diagram 100 illustrating an environment in which the present concepts may be employed. A camera system 102 is positioned to monitor rigid and semi-rigid objects 104a-104n. The arrows associated with each of the objects 104a-104n represent different motions or movements of the objects 104a-104n. It is also to be understood that in the following discussion, a semi-rigid object is understood to be equivalent to a configuration of point locations that undergo a similarity transform, with some deviation on the locations.

In alternative environments, the camera system 102 may be in a stationary location or may be designed to be mobile. In the stationary embodiment the camera system will pivot and/or pan from the stationary position. Examples of stationary camera systems include security camera arrangements found in offices, stores, banks among other locations. A moving camera arrangement may be found on moving vehicles such as automobiles, trucks, airplanes, helicopters, boats, variously constructed Unmanned Aerial Vehicles (UAVs), as well as within warehouses, and factories where the movement is accomplished by combining the camera system with a track system, robotic arms or other platform that can carry and move the camera system.

The rigid or semi-rigid objects observed by the camera system may also be stationary and/or moving. These rigid or semi-rigid objects include but are not limited to automobiles, motorcycles trucks, airplanes, helicopters, boats, as well as components, products, and machinery within in warehouses or factories. Thus the present concepts may be employed in environments having some combination of the foregoing stationary and/or movable conditions.

Figure 2:
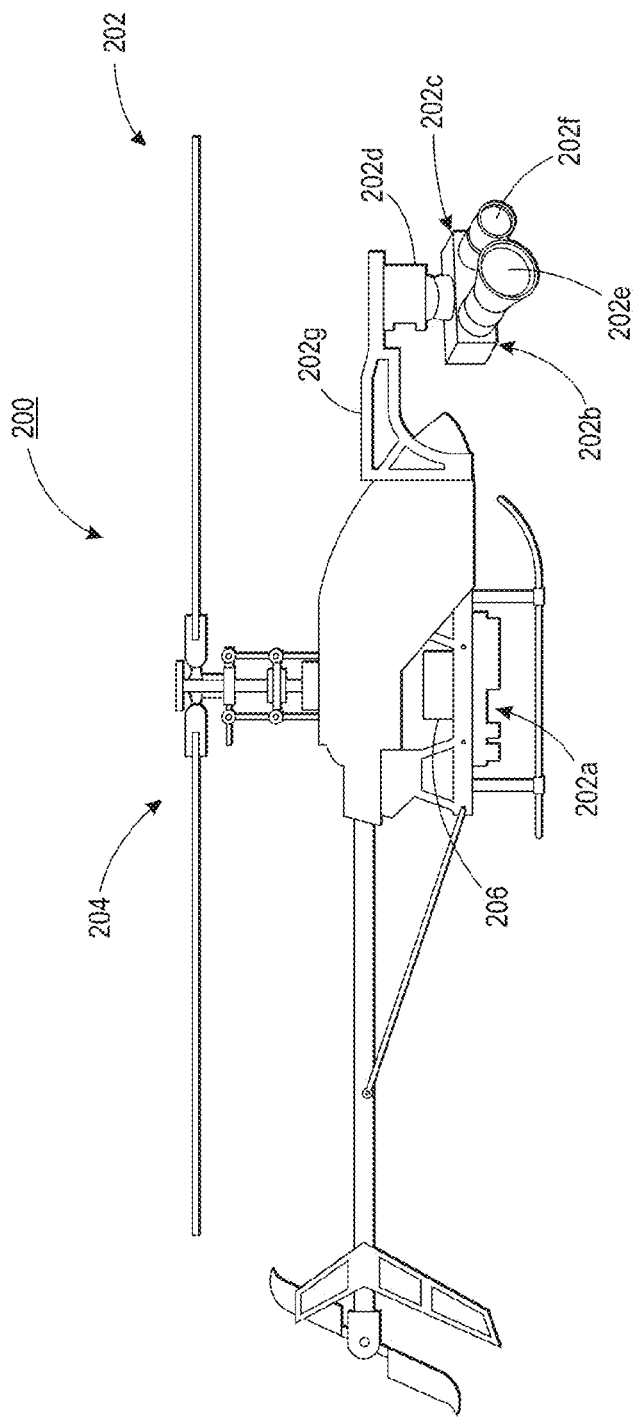
FIG. 2 illustrates another environment in which the present concepts may be employed.

Turning to FIG. 2, illustrated is a movable or mobile camera platform or arrangement 200 including a camera and monitoring system 202 associated with a movable platform such as Unmanned Aerial Vehicle (UAV)) 204, which in one embodiment is configured to monitor vehicle (e.g., automobile, truck, etc.) traffic moving on roadways, such as to monitor the speed of these vehicles. The UAV flies under control and navigation by a UAV Control Unit (including navigation components such as but not limited to a GPS system, electronic roadmaps, an altitude indicator, compass, Lidar, ultrasound or other RADAR, among other navigation equipment) 206. Camera and monitoring equipment 202 is mounted on the UAV 204. This equipment includes an onboard computing system 202a, and a pair of cameras (which in one embodiment are approximately axis-aligned digital cameras) 202b, 202c mounted on a pan/tilt device or gimbal 202d (in one embodiment this is a 2-axis, pan/tilt gimbal). One of the cameras 202b is affixed with a wide-angle lens 202e, the other camera has a telephoto lens 202f (i.e., they have different focal lengths). Images from the cameras are processed by the on-board computing system 202a. The pan/tilt gimbal 202d is secured to the UAV 202 by a mounting bracket 202g. Movement of the pan/tilt gimbal is actively controlled by a tracking algorithm running in the onboard computing system 202a, in part in response to images received from the cameras 202b, 202c.

The cameras 202b, 202c are configured to servo and track a moving vehicle while the UAV 202 is in flight. More particularly the tracking algorithm allows the data from a wide-angle camera image to provide direct motion commands to the gimbal such that a companion telephoto camera zeros in on the object (e.g. vehicle) being tracked. Use of the tracking algorithm provides active control of the pan/tilt gimbal. The onboard computing system 202a also includes at least one electronic processor, which may be a graphics or other electronic processing device. The on-board computing system 202a is also configured with input/output capabilities, including a communication system for communicating received and/or processed data to be relayed to locations off-site the on-board computing system, such as to a video screen and/or electronic storage. The communication system is designed for real time relay of the data to be transmitted.

Tracking Using Moving Vehicle Monitoring Procedure (MVMP)

Figure 3:
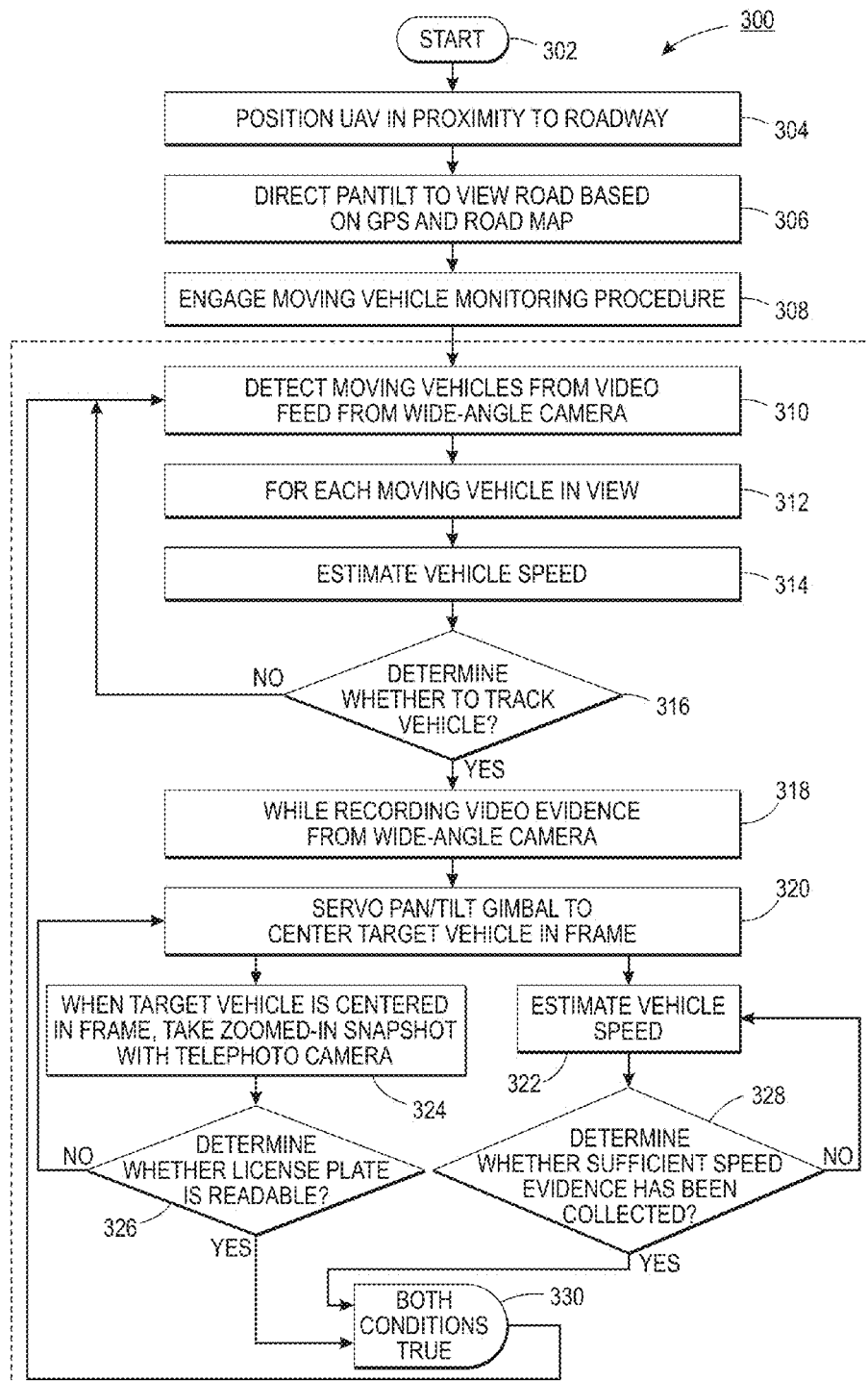
FIG. 3 is a flow diagram for certain concepts of the present application.

Turning to FIG. 3 shown is a flow diagram 300 illustrating a particular embodiment of present concepts. Following the start of the process 302, the UAV is positioned or flown alongside a roadway 304, and when within the desired proximity to the roadway, the camera and monitoring system is controlled (e.g., the pan tilt gimbal) based on GPS coordinates in registration with a roadmap 306. The location of the road in relation to the UAV, and the UAV's altitude are also determined by the map and GPS readings. This information, in conjunction with the compass heading of the UAV, allows calculation of camera gimbal pan and tilt coordinates to direct the camera at the roadway.

At this time a procedure developed by the present inventors, called herein a Moving Vehicle Monitoring Procedure (MVMP) is engaged 308. This MVMP procedure employs a tracking algorithm for data acquisition. Additionally, this application also describes a new computer vision object motion segmentation and tracking algorithm, and is referred to herein as a Point-Motion-Pair (PMP) Growth algorithm. The PMP Growth algorithm includes processes for tracking objects (e.g., vehicles) despite large frame-to-frame motion. Implementing the present concepts with the PMP Growth algorithm permits the acquisition of the target vehicle to be accomplished in an automated manner, i.e., human intervention is not needed to identify the target vehicle. Implementation of the PMP Growth algorithm will result in the output a list of detected moving objects (vehicles) appearing in the wide-angle camera feed 310.

Then for each moving vehicle in the wide angle view 312, the system estimates each vehicle speed 314, and automatically determines whether to track the vehicle 316. In normal operation the MVMP process will select a vehicle with the fastest estimated speed, when the speed of the vehicle exceeds a predetermined threshold. If no vehicle in the video feed meets the stated criteria the process loops back to step 310. However, if there is a vehicle that is determined to be above the estimated threshold speed the system begins to record video evidence and while this recording is occurring 318, the MVMP process operates the servo pan/tilt gimbal to direct the wide-angle camera to center the target vehicle in the field of view 320. In one embodiment the serving algorithm to achieve and maintain fixation on the target vehicle is a PID controller with a feed-forward signal based on the object's motion in the image. Also, while it is useful to commence recording video evidence of the vehicle's speed when the vehicle is selected, it is not necessary. This video data can be stored for later analysis and dispute resolution. It is noted that when the present operations employ the PMP Growth algorithm both the selection of the target vehicle and the operation of the servo pan/tilt gimbal is accomplished without human intervention, as opposed to use of a tracking algorithm that requires human intervention to select the target vehicle.

Once the wide-angle camera is directed to center the vehicle being tracked, the MVMP process estimates the vehicle speed 322 and when the target vehicle is centered in the video frame the algorithm directs the telephoto camera to take a zoomed in high-resolution snapshot, to gather video evidence of the targeted vehicle's license plate number 324. Prior to taking the telephoto high-resolution snapshot the process makes an inquiry as to whether or not the license plate is readable 326. If the response is negative the process loops to step 320 and a more refined movement of the camera arrangement by the servo pan/tilt gimbal is undertaken. Similarly, in step 328, an inquiry is made if sufficient speed evidence has been collected. If the response is in the negative the process loops back to step 320 and again more refined movement of the camera arrangement is undertaken to increase the amount and/or quality of collected data.

In the present embodiment steps 326 and 328 are occurring in parallel (with step 326 using the telephoto camera). When vehicle identity and speed measurement are complete, (Both Conditions True) 330,the MVMP procedure returns to the step of monitoring all traffic in view with the wide-angle camera in search of the next target vehicle, i.e., step 310.

Violation data and information is then transmitted to the ground in real-time for law enforcement and service industry usage. It should also be noted that any data from non-offenders will not be stored or transmitted to the ground. Only the automated tracking system will have access to these data for a brief time before it is destroyed.

Figure 4A:
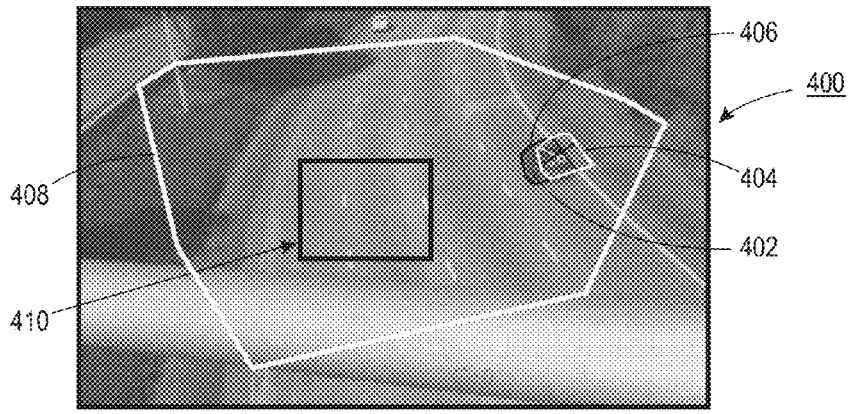
FIGS. 4A-4C depict a series of image frames.
Figure 4B:
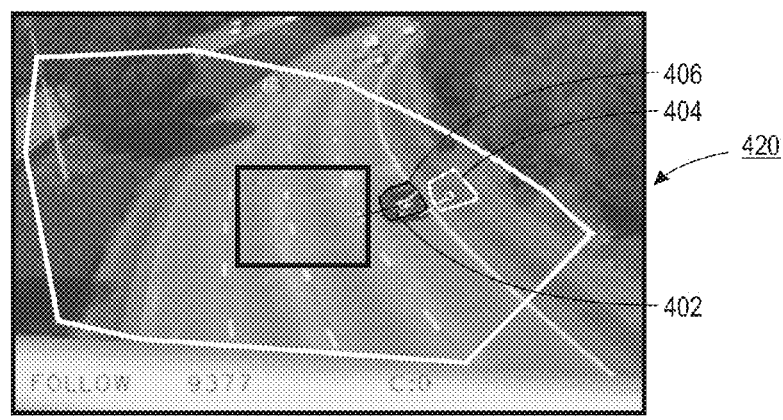
Figure 4C:
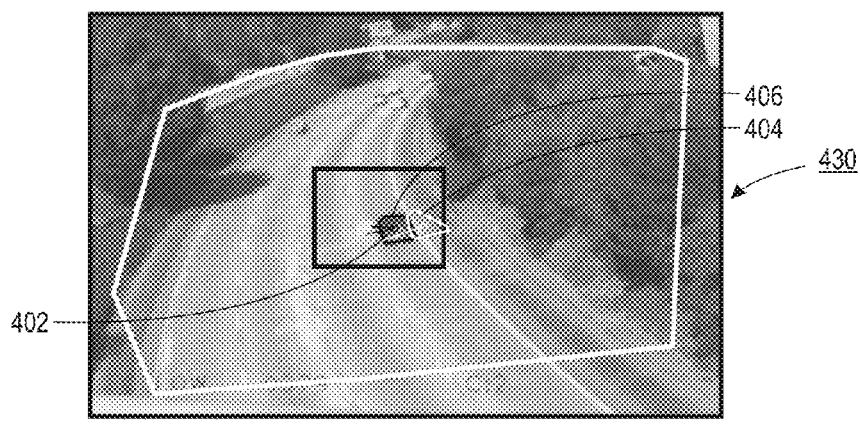

FIGS. 4A-4C present three video image frames (400, 420, and 430 respectively) of a sequence captured from a prototype of the presently described system. The sequence shows a target vehicle 402 in frame 400 at an edge of a wide-angle image, then in video image frame 420, the vehicle is moved more to the center of the image, and finally in frame 430 the vehicle 402 is centered in the image. The centering of the vehicle 402 is accomplished by servoing the pan/tilt gimbal. The position of the target vehicle 402 in a previous frame is defined by the outline 404 and the position of the vehicle in the current frame is defined by the outline 406. The large outline 408 indicates another coherently moving region representing the road and surrounding terrain. In general, other vehicles will be represented by other outlines. The inner box 410 defines the field of view of the telephoto camera. As can be seen, the target vehicle 402 appears closer to the center of the image as the tracker algorithm follows it.

Figure 5:
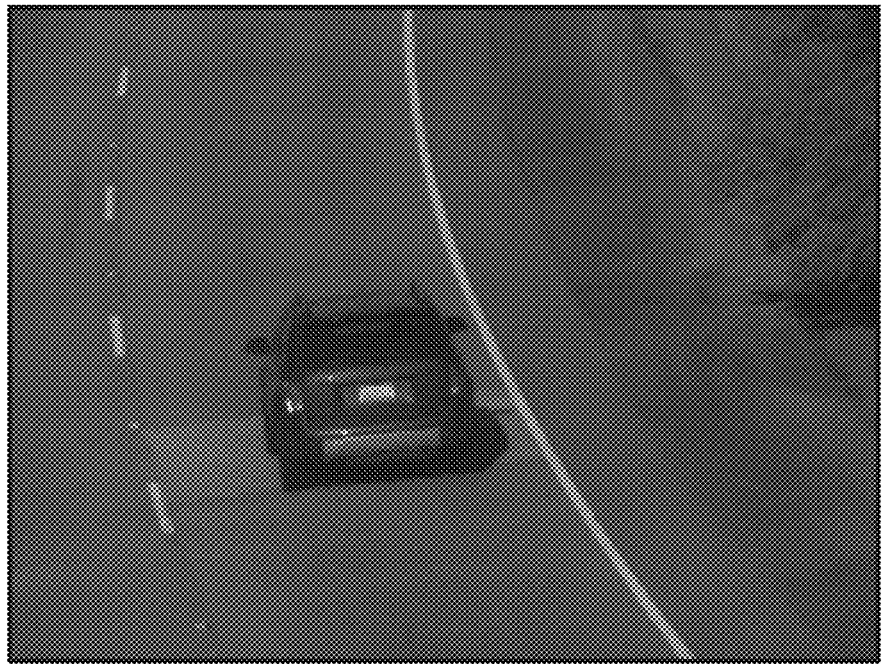
FIG. 5 is a wide angle view of a vehicle being tracked.
Figure 6:
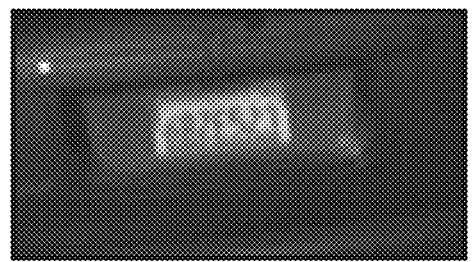
FIG. 6 is a telephoto view of the license plate of the vehicle being tracked.

When the target vehicle has been suitably centered, the telephoto camera is engaged to capture a high-resolution snapshot. Because this camera is approximately axis-aligned with the wide-angle camera, the image will be centered on the target vehicle. FIG. 5 shows a telephoto image, and FIG. 6 depicts the license snapshot region of the telephoto image where the license plate is found.

An automatic procedure is used to determine when a zoomed-in snapshot sufficient to identify the vehicle has been obtained. In one embodiment, this procedure employs an Automated License Plate Recognition system (ALPR). The ALPR is run on the zoomed-in snapshot. If it returns a valid license plate with sufficient confidence while the wide-angle tracker maintains the target vehicle in view, then the vehicle identity is established. ALPR systems are well known in the art, and such systems are available from a number of sources. Alternatively, a human crowdsourcing system is used to transcribe difficult-to-read license plates.

While tracking a selected vehicle, the MVMP engages a more precise speed estimation procedure than used to select the selected vehicle. Three of these methods are disclosed below.

Speed Measurement Method 1: Camera Geometry

If the UAV's motion and location are known, target vehicle speed is measured by its changing location with respect to the UAV. The UAV's location and motion through space are measured through sensors (e.g., GPS, etc.) and the UAV's height above the ground further refined by downward-directed sensor (e.g., radar, such as Lidar, or ultrasound). At each moment of time, the target vehicle's location with respect to the UAV is established by well-known trigonometric calculations using the UAV's compass attitude, the direction of the pan/tilt gimbal, and the target object's location in the image. Target vehicle speed is established by difference in positions at successive times. By this speed measurement method the target vehicle, in some embodiments, will be tracked for a mile (a kilometer) of more, or for a half a minute of more to measure the vehicles speed by distance the UAV has travelled as measured by GPS.

Speed Measurement Method 2: Local Landmarks

The target vehicle's speed is measured by the time it takes to traverse local landmarks. Apt landmarks are lane striping and spacing of bots dots. In a sequence of frames, lane stripes are found by image processing and curvilinear line tracing. The number of milliseconds required for the vehicle to pass one or more lane stripes is measured, and the speed calculated. This speed measurement allowing speed calculations within a few seconds or less.

Speed Measurement Method 3: Extended Following

The target vehicle's speed is measured by following it for an extended period of time measuring the time it has traveled by virtue of UAV GPS coordinates, or passing of calibrated landmarks such as painted mile markers. By this speed measurement method the target vehicle, in some embodiments, will be tracked for a mile (a kilometer) of more, or for a half a minute of more.

Computing Vehicle Speed

This section describes in more detail a sequence of operations for computing an object's speed (e.g., a car or other vehicles travelling on a roadway) using centroid measurements from images of objects captured by a camera (e.g., the centroid of keypoints of a semi-rigid object model). Generally, it is understood that speed is determined by a series of position measurements recorded at known times, and the primary challenge is determining a vehicle's position from camera based measurements.

The discussion will initially discuss obtaining a vehicle position from a single camera measurement. The image-matching algorithms of the present application return a camera focal plane centroid coordinate for a moving object. The process of determining a world XYZ position from an XY centroid location on a camera focal plane involves a series of coordinate transformations. The present discussion will start by describing the process for a rigid, fixed camera and progressively incorporate the various transformations necessary to represent a complete system. For all calculations it is assumed that a car must travel on the surface of the ground, which is a known two dimensional surface (either approximated as a flat plane where appropriate, or the existence of a well surveyed topographical map is assumed).

Centroid Position in World Space Given a Rigid Camera and a Known Surface

Figure 7:
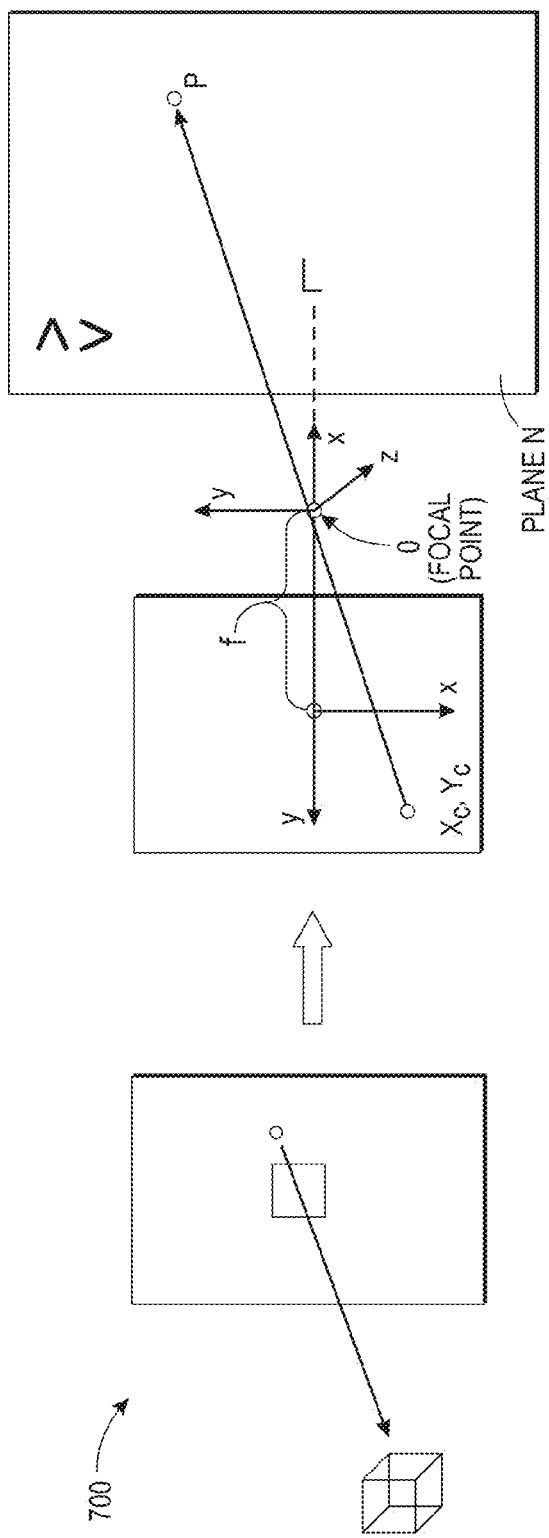
FIG. 7 is an ideal pinhole camera model.

Ignoring any lens distortion effects, or assuming a well calibrated lens, a camera is defined herein by the ideal, pinhole camera model 700 depicted in FIG. 7. The camera defines a coordinate system with XYZ axes, centered at the focal point of the camera, O, and has focal length, f. The boresight of the camera is aligned with the +x direction (i.e., to the right of the focal point of the camera "0") and the focal plane is parallel to the YZ plane. The focal plane has its origin on the plane and on the x axis of the camera coordinate system, and xy axes aligned with the camera's −z and −y (i.e., to the left of the focal point of the camera "0") axes, respectively. A ray of light originating from a point in world space crosses through the focal point of the camera and intersects the camera's focal plane at point (Xc,Yc). Any light source along that same ray will map to the same camera location.

For example, a centroid coordinate (Xc, Yc) on a camera focal plane at focal length f, (Xc, Yc, and f are in the same units, e.g. millimeters) maps to a normalized vector in the camera coordinate system, V.

$$\vec{V} = \frac{\langle f, Yc, Xc \rangle}{|\langle f, Yc, Xc \rangle|}$$

As mentioned above, with the limited information presently discussed above, the distance to a light source cannot be directly measured from a single pixel coordinate in a single camera image. However if the light source originated from a known surface this measurement is obtainable. For example, if the light originates from a plane N orthogonal to the boresight of the camera and placed distance d from the camera origin, the position, P, of the point on plane N is:

$$P = \left(d, Yc * \frac{d}{f}, Xc * \frac{d}{f}\right)$$

Even if the surface isn't planar, so long as it is known relative to the camera coordinate system then the intersection of the vector V originating at O with surface S can be computed. A well surveyed topographical map of a road would be an example of a known though non-planar surface. The surface coordinate corresponding to each point on the focal plane of a camera with known position and orientation could be computed by established ray tracing or z-buffer rending techniques, by piecewise planarization of the surface (e.g. from a topographical map) and repeated vector-plane intersection tests. In practice such calculations have been proven to be very fast.

Given a Camera Attached to a Rigidly Mounted Gimbal

A rigid camera can only measure positions of objects during the periods of time when their projections fall within the camera's limited field of view. However, if the camera is mounted to an actuated gimbal then the camera can be driven to track those objects over a much wider angular range. Assume a camera is mounted to a 2-axis, pan/tilt gimbal such as shown in FIG. 2.

One motor commands the pitch and another motor commands the yaw, and the cameras and motors are connected through a series of support brackets. The pitch frame rotates with the camera and is offset from the coordinate system of the yaw frame. In the equations that follow, a 4×4 matrix and homogeneous coordinates are used to simultaneously represent the translation and rotation of one coordinate frame relative to another. The following set of transformations exists, where 'M' denotes transformations that are assumed to be static, e.g. they represent coordinate transformations due to the gimbal and camera structure and mounting, and 'T' is used to denote transformations that change, e.g. rotation of a servo motor.

C=Camera local coordinates
$M_{C2P}$=Camera coordinates represented in the frame of the actuated pitch motor
$T_{P2Pn}$=Pitch motor relative to its nominal state (aka commanded pitch rotation)
$M_{Pn2Y}$=The nominal pitch frame relative to the yaw motor frame
$T_{Y2Yn}$=Yaw motor relative to its nominal state (aka commanded pitch rotation)

If the nominal orientation of the yaw motor bracket is equivalent to the "world" coordinates, then the camera's local coordinate frame in world coordinates is:

Yaw nominal frame=Yn=World frame=W $T_{C2W}=T_{C2Yn}=T_{Y2Yn}*M_{Pn2Y}*T_{P2Pn}*M_{C2P}*C$ Again, Mpn2y and Mc2p represent transformations due to the physical structure of the gimbal. Assuming the structure is rigid and engineering tolerances these can be assumed to be static and known. They could also be determined and/or validated with calibration. Furthermore, with these assumptions, if it is further assumed that the pitch and yaw axes are designed to be orthogonal and ignore any relative translation of the various coordinate frames is ignored (e.g. it is assumed the impact of the camera's 1" offset from the yaw axis is negligible compared to the measurements of vehicle positions on the road in fractions of miles) then Mpn2y and Mc2p can be dropped entirely.

$T_{C2W}=T_{C2Yn}\approx T_{Y2W}*T_{P2Y}*C$

So it is now possible to compute the location of the camera's focal point and the direction of a camera frame vector to a vehicle in the world coordinate system, and using this information the position of the vehicle in the world coordinate frame may be computed.

Given a Camera on a Gimbal on a Moving Vehicle

In the implementation of the UAV of the present application, the gimbal is not fixed rigidly in a known location it is on a moving platform. Further as discussed in the system of FIG. 2 a number of sensors are provided in the UAV arrangement. Including and/or in addition to those, for this example there would be a sensor for measuring XYZ position in world space (e.g. an ideal GPS unit and possibly an altimeter) and a sensor for measuring orientation in world space (e.g. an ideal Attitude and Heading Reference System (AHRS) unit, and/or a gyro/Inertial Measurement System, IMU, with compensation for sensor drift). The sensors, ideally, are collocated with the gimbal frame described in the previous section. However, due to size, weight, space, or even magnetic or electronic interference reasons, these sensors might also be mounted elsewhere on the UAV, and possibly apart from each other. So, there need to be transformation matrices between these sensors and some common frame on the UAV. For simplicity, the Yaw nominal frame from the previous section is selected. Furthermore, it is assumed that the XYZ sensor's readings are independent of orientation and that the orientation sensor's readings are independent of position so that:

$T_{XYZ\_2\_W}$=XYZ position sensor reading
$T_{AHRS\_2\_W}$=Orientation sensor reading
Sensor frame to world frame=$T_{S2W}=T_{XYZ\_2\_W}*T_{AHRS\_2\_W}$
$M_{Yn\_2\_S}$=The Yaw nominal frame relative to the sensor frame $T_{C2W}=T_{S2W}*M_{Yn\_2\_S}*T_{C2Yn}*C$ Transformation matrices such as shown above are conventionally read from right to left. Therefore the forgoing series of equations are intended to explain there is a vector to the car in the camera coordinates, that this vector is transformed into a vector in the frame of the pan/tilt camera mount, then this vector is transformed into a vector in the frame of the GPS/Compass (AHRS) on the UAV, and finally this vector is transformed into a vector in "World" which would be (latitude, longitude, altitude).

Myriad Possible Sensor Configurations and Camera Fixtures

The previous section is in no way meant to limit the possible arrangements of sensors for determining the position and orientation of a camera on a vehicle, nor is the description of the pan/tilt gimbal or its degrees of freedom intended to limit the ways in which a camera may be held or actuated. It was merely meant to describe that there will be a chain of coordinate system transformations between the camera frame, measuring the vector to the car, to the world coordinate frame. Those transformations are the result of the relative mounting of the camera to the UAV and its actuators and the relative mounting and dynamics of the system sensors.

In the above sections structures were described as ridged for the purposes of explanation (i.e., the 'M' variables), but structures in a real UAV may vibrate or change shape (e.g. by thermal deformation), making the 'M' variables non-constant values. It is within reason to expect that additional sensors, such as accelerometers or temperature sensors or markers, may be placed onto critical locations on the structure to be used to determine and dynamically update the values of the 'M' variables. Therefore, models of the structural dynamics, such as from finite element analysis, may also be incorporated into the calculation of the 'M' variables. Furthermore, a calibration routine may be used to determine the values of those variables.

Also described in the previous sections was a limited set of ideal sensors, but that is not intended to limit the system configuration. There are a multitude of sensors and sensor combinations that may be used for determining the position and orientation of an aircraft or ground vehicle. GPS gives latitude, longitude, and altitude; however the readings do not update rapidly and, particularly for altitude, are not necessarily reliable, depending on the performance desired. Magnetometers can be slow to sense change in orientation, but are resistant to drift, while gyroscopes and IMU's can give fast, accurate estimates of changes in velocity and orientation, but have problems with drift if used as position and orientation sensors on their own. Some types of sensors with overlapping purposes are often used in combination to improve the overall measurement, for example gyroscopes and magnetometers together can deliver fast, accurate measurements of orientation change while resisting drift (these are now popularly sold as packaged AHRS units).

Additionally, the relative coordinate transforms, sensor measurements, system dynamics, and control inputs can, and should, be filtered to improve the accuracy of the estimates of the position and vector measurements of the camera data transformed into the world frame. Examples of the impact of sensor noise will be discussed in the next section, but the necessity for sensor filtering is not new to aircraft or robotics. For a system such as described here, filters which incorporate sensor and system dynamics, such as Kalman filters, Histogram filters, and Particle filters would be appropriate for filtering camera measurements.

Such a system may be created from individual components, i.e. the full structure, sensor components, and control systems (software/hardware for executing motion commands of the full system or components of the system), may be custom or be assembled from a mix of custom and commercial off the shelf products. With the growing popularity of UAV's, it is reasonable to assume that one might purchase a commercial of the shelf UAV, an aircraft with included position/attitude measurement hardware, electronics, and software for flight control, to which a camera and gimbal may be attached. Irrespective of the above, the conceptual presentation of coordinate transforms from the camera to the world frame remains the same.

System Noise and Error Sources

Figure 8A:
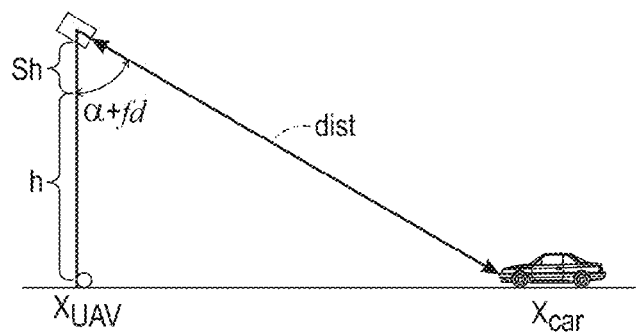
FIGS. 8A-8C depict sketches to illustrate concepts for measuring vehicle positions from a UAV position and orientation.
Figure 8B:
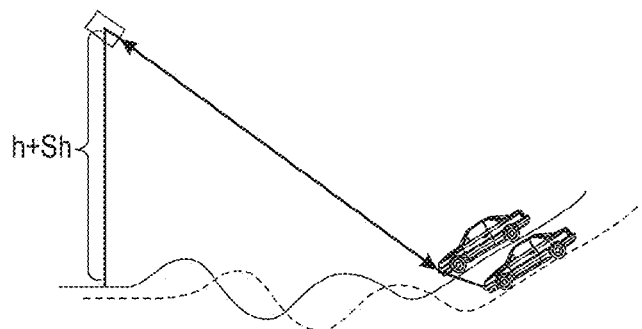
Figure 8C:
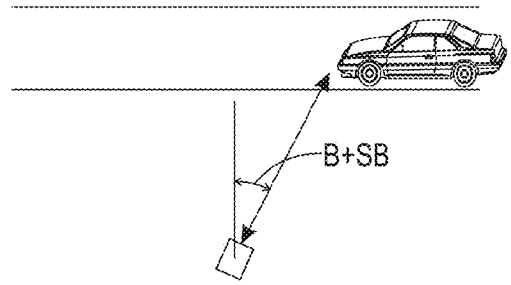

FIGS. 8A-8C illustrate sketches of the basic concept for measuring vehicle position from UAV position and orientation.

Figure 9:
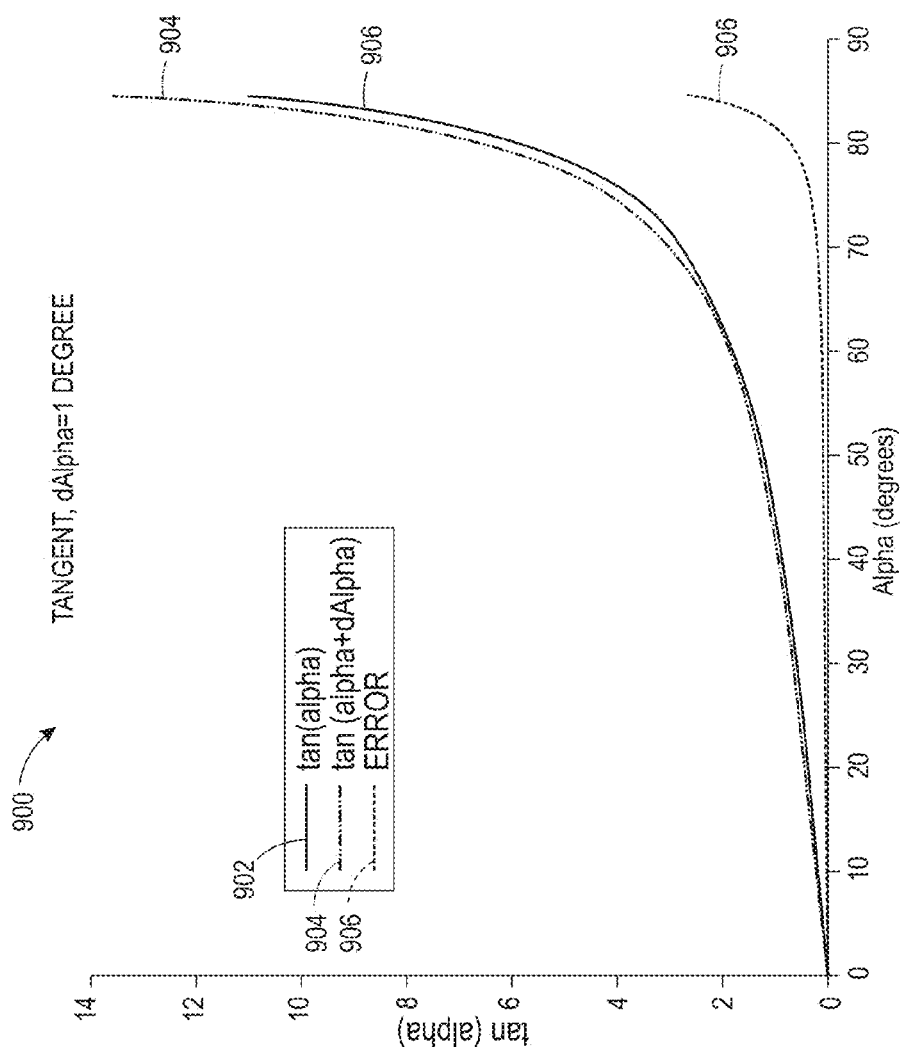
FIG. 9 shows the curve of the target function, the curve of the tangent function, plus a constant offset angle and the curve of the error between the two.

In FIG. 8A, the concept has been reduced to 2 dimensions, focusing on the "alpha", pitch angle's contribution and the UAV altitude contribution to the calculation of "range to car". UAV compass heading, "beta", is not a contributor to the estimate of "range to car". For a perfectly flat, level road (e.g., FIG. 8C), the uncertainty in UAV altitude is a direct scalar of the estimated range to car, the error scales linearly with altitude uncertainty. The contribution of error in the estimated pitch angle is nonlinear. FIG. 9 shows the curve of the tangent function, the curve of the tangent function plus a constant offset angle, and the error between the two. The error has a sharp knee in its curve when the tangent function begins rapidly approaching infinity. Assuming a nominal altitude for the UAV, the acceptable range of angles over which the vector to car can be used as a position measurement must be chosen accordingly. If the UAV is directly overhead of a car then the error is negligible, but as the camera points towards horizontal the error increases rapidly. The error is still a known function, so an Extended Kalman Filter, for example, could still incorporate new data appropriately, but that only means that the filter will rely less and less on new input data as error begins to dominate.

FIG. 8B shows a sketch of a very hilly terrain. In the flat, level road assumption (FIG. 8C), only the UAV's altitude contributed to error in the estimate of range to car. However, if the car is on a hilly terrain using a topographical map, then errors in the UAV's latitude and longitude also contribute, because the difference in altitude between the UAV and the car is a function of their latitudes and longitudes. The error in relative altitude is proportional to the gradient of the road at the location of the car.

Estimating Speed

Up to this point the discussion has been of estimating the instantaneous location of a car given a camera image and sensor measurements of the orientation and position of that camera. The goal, however, is to estimate vehicle speed. Velocity is change in position over time. Ideally, given perfect measurements, velocity could be estimated from exactly two camera images, but the present system will have noise. For example, there is noise in the position estimates, which have been discussed, and noise could exist in the estimates of the time each camera image was taken. Realistically, however, digital video cameras are triggered using either internal or external signal generators that are so precise as to make the timing error between frames negligible. Camera frames can also be synchronized with world clock time using the system clock, presumably itself synchronized with the clock signal from the GPS sensor.

In earlier sections, a proposed filter was an Extended Kalman Filter or other filter for improving the measurement of the UAV's position and orientation. A filter will also be used to estimate the car's velocity given a series of position estimates. In the proposed filter, a car will be modeled as having a constant, unknown velocity, but the velocity will be assumed in order to initialize the filter (e.g. assume cars are moving the speed limit). When a car is first detected in the camera imagery, the vehicle's position will be estimated as described previously, and an assumed velocity will be assigned (e.g. the speed limit), but a low confidence level will be assigned to that velocity assumption. A prediction will then be made as to what the car's position will be in the next camera frame given the assumed velocity. There will be some error between the predicted car position and the actual computed car position in the next camera frame. Kalman filters and other filters are defined algorithms for updating estimated values, e.g. velocity in this case, given sensor data and sensor noise. If the car is travelling at a constant velocity then the estimated velocity will converge to that true velocity.

UAV Based Tracking System

By implementation of the UAV based tracking system 202, greater spatial coverage is obtained compared to fixed systems, with faster positioning to locations of interest than mobile ground-based systems. Implementing the described system and method provides lower operating cost than human-operated systems due to autonomous operation and smaller and lighter aircraft, as well as the ability for dynamic enforcement. The UAV can change enforcement positions easily as traffic conditions change.

The system and method described above therefore provides a vehicle speed tracking system and method employing a computer vision algorithm that detects moving objects with respect to background motion where the background motion is created by motion of an airborne camera platform. In one embodiment the computer vision algorithm located on an airborne platform automatically picks out a vehicle to track, and then continues tracking through active control of the pan/tilt camera. Use of approximately axis-aligned cameras on a pan/tilt device mounted on an airborne vehicle obtains high-resolution images of vehicles from a telephoto camera while guiding the pan/tilt camera under visual tracking control of the wide angle camera. Finally, use of an unmanned aircraft (UAV) is used to estimate the speed of a ground vehicle measured by GPS coordinates of the aircraft and the geometry of direction of the pan/tilt camera while maintaining visual tracking of the vehicle.

A particular aspect of the present application is related to processing captured images of moving objects in an improved manner which addresses shortcomings of existing image capture and processing systems and methods.

For example, in the environment shown in FIG. 2, image shift may occur due to motion of the UAV and pointing of the pan/tilt gimbal holding the cameras. Due to image shift, the location of a target object in the image frame can change rapidly and unpredictably, which poses problems for traditional image capture and processing methods relying on optical flow, keypoint tracking alone, or prediction of a search window, as discussed in the Background of this application. It also to be appreciated image shift problems discussed in connection with FIG. 2, are also found in other environments, such as if the camera system is carried on a plane, a boat, a car, in situations described in connection with FIG. 1, among others.

PMP Growth Algorithm Overview

The PMP Growth Algorithm, of the present application is designed to address this image shift issue. In that regard the PMP Growth algorithm provides for a computer vision process and system that searches for collections of image keypoints that maintain consistent local appearance, plus coherent geometrical relations, under a similarity transform between successive frames. Keypoints are detected in a "current image frame" based on known methods. Hypotheses are formed about corresponding keypoint locations in a "previous image frame", and a search procedure forms groupings of keypoints whose current image frame and previous image frame correspondences comprise a consistent similarity transform.

The PMP Growth algorithm uses a concept introduced herein of Point-Motion-Pairs, wherein a pair of keypoint correspondences for successive frames defines a unique similarity transform. The PMP Growth Algorithm further provides for the growth of coherent motion regions from seeds formed from clusters of the Point-Motion-Pairs, where a seed is formed of one or more clusters and an image frame may have more than one seed. An objective of the PMP Growth Algorithm is to define the rigid and/or semi-rigid objects identified by the cameras, as object models, and more particularly herein as Similarity Transform Object Models (STOMs) and track the STOMs through a sequence of image frames captured by a camera system (e.g., 102 and 202 of FIGS. 1 and 2).

In this discussion, a Similarity Transform Object Model is understood to be a data structure that maintains collections of keypoints representing a coherent motion or change in motion among the collection of keypoints, within an accepted tolerance. In this discussion, the change is considered a change in location, rotation, and scale (similarity transform) between regions in successive image frames (e.g., a previous image frame and a current image frame—captured by a camera system).

Figure 10:
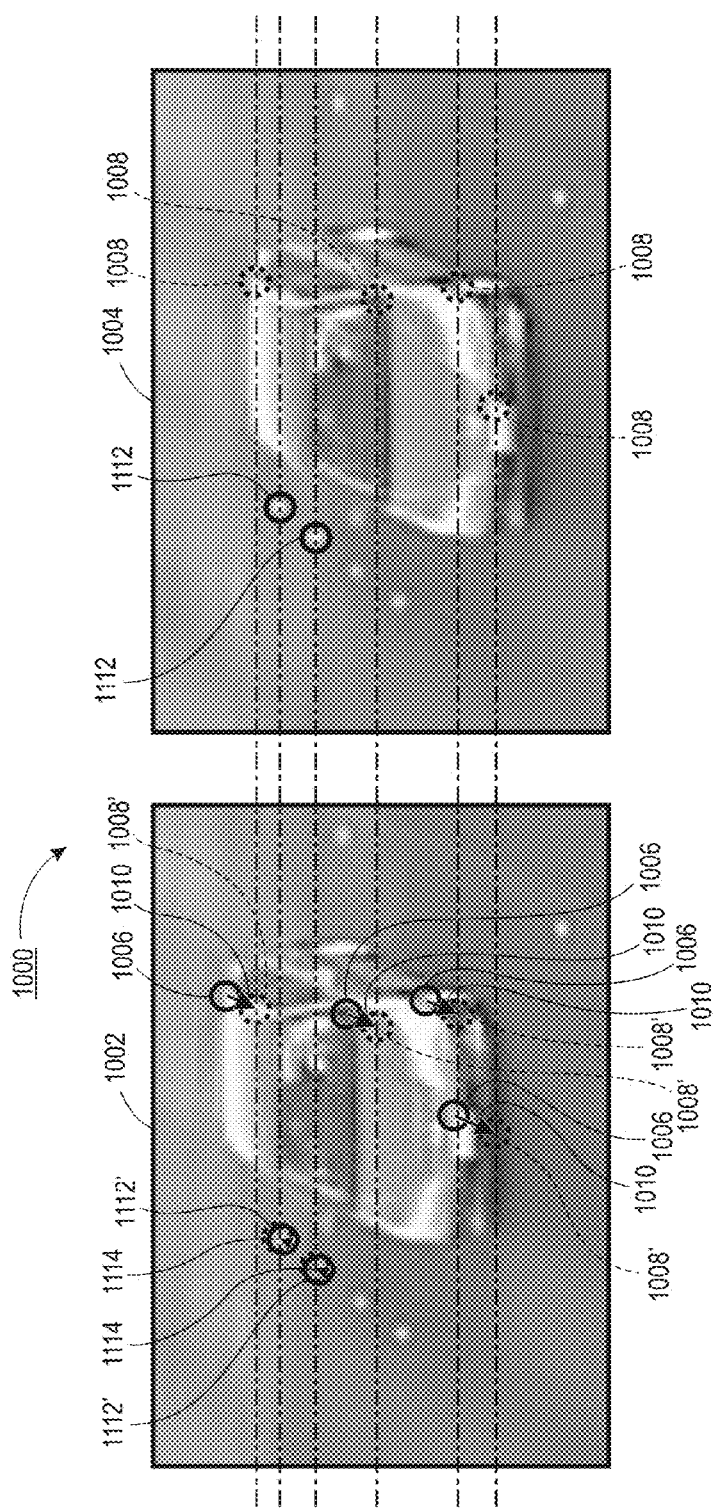
FIG. 10 illustrates object motion between successive video frames

Turning to images 1000 of FIG. 10, the concept of object motion between successive frames (i.e., previous image frame 1002 and current image frame 1004) is illustrated. More particularly solid circles 1006 indicate feature point locations in the previous image frame 1002. Dotted circles 1008 indicate corresponding features in the current image frame 1004. Arrows 1010, starting at the solid circles 1006 and extending to the dotted circles 1008' (carried over from the current image frame 1004), represent a distance and direction the objects (e.g., STOMs) have shifted between the two image frames 1002 and 1004. Further, circles 1012 in current image frame 1004 and circles 1012' in previous image frame 1002 indicate keypoints with coherent motions different from the solid circles 1006 and the dotted circles 1008 (1008'). This direction difference being illustrated, for example by comparing the direction of arrows 1014 to the direction of the arrows 1010. While incomplete, the sets of illustrated circles comprise two Similarity Transform Object Models (STOMs) in the current image frame 1004 for this scene. Where the first STOM is represented by circles 1006 (representing the vehicle) and the second STOM in the current image frame represented by circles 1012 (representing background).

Image keypoints discussed above, and used in the present description can be found by a number of known keypoint (or feature) detection methods. One particular method is known in the art as Features from Accelerated Segment Test (FAST) keypoint detection which is well known and described in the Computer Vision literature. The FAST algorithm finds locations whose center pixel is surrounded by a ring of contiguous pixels that are either lighter or darker than the center by a pre-determined threshold value. However, keypoint detection methods are imperfect. It is not uncommon for keypoints to be found in one frame of a video sequence corresponding to some visual feature on an object, but for this feature not to be found in other frames. Therefore, the PMP Growth algorithm does not rely solely on feature detectors (such as FAST) to reliably find corresponding keypoints.

Many object segmentation and tracking algorithms rely on tracking keypoints from frame to frame using optical flow. These methods fail if the object jumps abruptly to a distant pose (location, rotation and scale) in the image frame, such as due to movement of the camera. In an Unmanned Aerial Vehicle application such as shown in FIG. 2, the camera system is mounted on a pan/tilt device and by such a platform unpredictable rapid motions can occur. As opposed to existing concepts the PMP Growth Algorithm uses the strategy of tracking by detection, where such a strategy uses the detection capacity of a computer vision program such as the PMP Growth system and method described herein. No prediction of object motion is relied on, instead, known objects (STOMs) are found regardless of their movement from one image frame to the next, despite or irrespective of motion caused by movement of the UAV.

In considering two successive frames, such as the mentioned current image frame and previous image frame, as illustrated in connection with FIG. 10, the background and moving objects of the images will be shifted, rotated, and scaled in different ways between the image frames due to camera and object motions.

Therefore an aspect of the PMP Growth algorithm is to take keypoints found in the current frame, and find corresponding locations in the previous frame. It is to be understood however, that the PMP Growth algorithm is not simply matching keypoints found in the previous frame against keypoints found in the current frame. This tactic is not used because keypoint locations found by the keypoint detectors (e.g., FAST detector) are insufficiently stable between frames. Instead, the PMP Growth algorithm seeks keypoint appearance correspondence between successive frames. Keypoint appearance correspondence occurs when a location can be found in the previous frame that matches the appearance of a detected keypoint found in the current frame.

Figure 11:
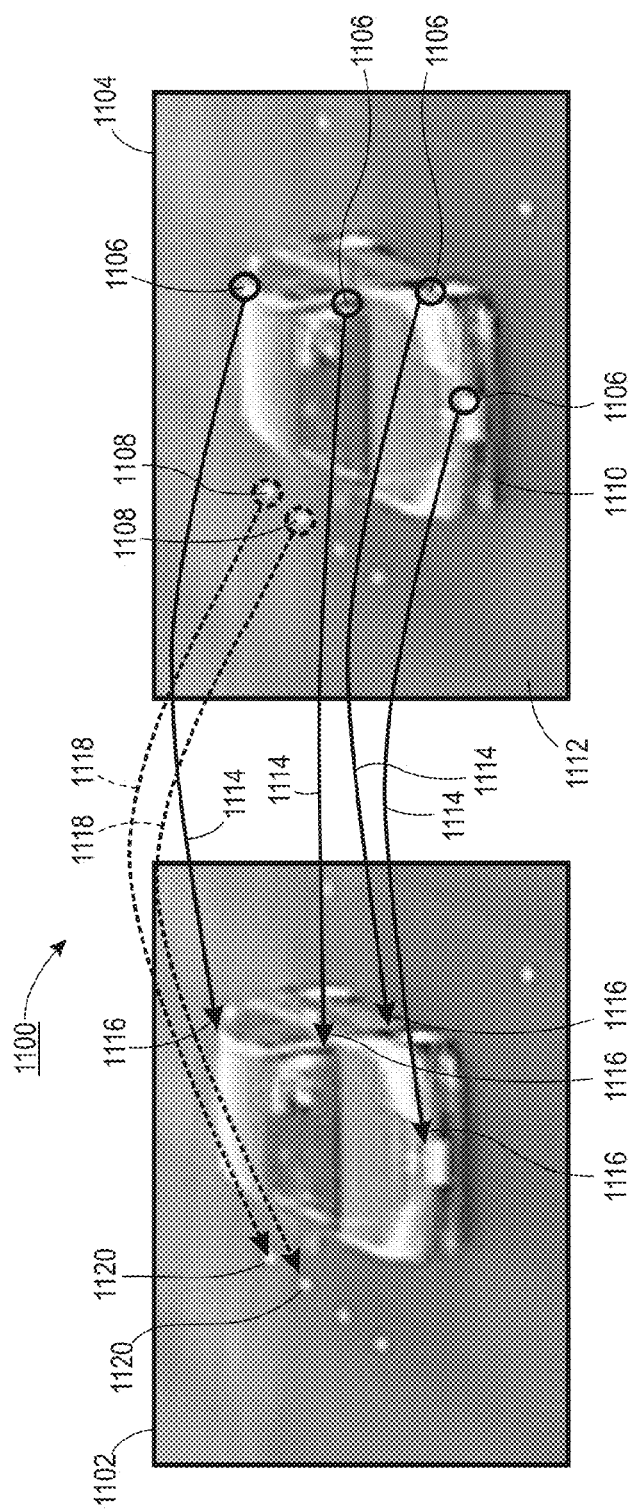
FIG. 11 Illustrates keypoints found in a current image frame by a keypoint detector and corresponding locations for these keypoints in a previous image frame.

An example of the forgoing concept is illustrated by images 1100 in FIG. 11 including a previous image frame 1102 and a current image frame 1104. Circles 1106 and 1108 in current image frame 1104 identify keypoints found in the current frame 1104 by a keypoint detector (e.g., a FAST detector). Circles 1106 represent keypoints associated with the vehicle in the image 1110, while circles 1108 represent objects on the roadway (these may be considered background of the image) 1112. The PMP Growth Algorithm operates to then find corresponding appearance locations corresponding to the keypoints in previous image frame 1102, where the locations in the previous image frame 1102 will have an appearance substantially matching the appearance of the area of the image surrounding the relevant keypoint in the current image frame 1104. In FIG. 11 arrowed lines 1114 are used to point from the keypoints identified by circles 1106 to corresponding locations 1116 on the vehicle in images 1110, and arrowed lines 1118 are used to point from keypoints 1108 representing objects on the roadway 1112 to corresponding background locations 1120 in the previous image frame 1102. It is to be appreciated for clarity of description only a sampling of the keypoints and associated locations for these images are shown.

Also, while the discussion related to FIG. 11 show the locations 1116, and 1120 in the previous image frame 1102 being derived based on the keypoints 1106, 1108 from the current image frame 1104, as described below, keypoints previously found in a previous image frame will also be used in the PMP Growth algorithm as means to bootstrap the search for (current frame) keypoints to (previous frame) location appearance mappings. It is also mentioned here that in embodiments of the PMP Growth system and method, is designed with a matching maximum threshold or cutoff, where once a certain number of matches are obtained the PMP Growth system and method will end the matching operation. The PMP Growth system and method is also designed in certain embodiments to have a matching minimum threshold (after the initial frame operation), wherein if a minimum number of matches are not found the process moves to a next previous image frame.

In one embodiment of the present concepts the matching of keypoints to locations using the appearance of the location (i.e., local appearance feature match) is accomplished by use of a binary feature vector describing the pattern of pixel lightness and/or colors in the neighborhood of the keypoint. In this embodiment a feature descriptor developed herein and called Symmetric Binary Robust Independent Elementary Features (SBRIEF) feature descriptor is employed. The SBRIEF feature descriptor being a variant on the Binary Robust Independent Elementary Features (BRIEF) feature descriptor, which is well known and has been described in the computer vision literature, such as described in "BRIEF: binary robust independent elementary features", M. Colonder, V. Lepeti, C. Strecha, P. Fua, ECV 2010, hereby incorporated in its entirety by reference. Distinct from the BRIEF feature descriptor, the SBRIEF feature descriptor uses a particular layout pattern of sample locations with respect to the central location. This concept is illustrated in an SBRIEF feature descriptor layout 1200 of FIG. 12, which includes 17 sample points including a central keypoint 1202, around which the other sample points (i.e., the other solid circles) are strategically distributed. All point pair combinations of the 17 sample points are determined (i.e., for 17 sample points there are 136 pairs). The SBRIEF feature descriptor comprises a 272-bit feature vector (i.e., 136×2-272 bits, using 2 bits per point pair) describing all combinations of relative lightness values among the 17 sample locations. In one embodiment, a method which may be used is described in Jie Liu, Xiaohui Liang, "I-BRIEF: A fast Feature Point Descriptor With More Robust Features", Signal-Image Technology on Internet-Based Systems (SITIS), 2011 Seventh International Conference, pages 322-328, hereby incorporated in its entirety. Such a process allows for pairwise lightness comparison with a tolerance. The Hamming distance can be 0, 1 or 2 for any point pair. It is to be appreciated that while this SBRIEF feature descriptor is used in this embodiment, other appearance descriptor processes may be employed in other embodiments. Following operation of the feature descriptor (e.g., in one embodiment the feature descriptor being the SBRIEF) results of such operations are provided to an appearance match catalog.

At the conclusion of every frame processing cycle, the set of keypoints found in the current image frame are partitioned (or segmented). In this partitioning some (usually most) of the keypoints will be assigned to Similarity Transform Object Models (STOMs) representing coherent motion objects. Other keypoints will not find corresponding matches in the previous image frame, and will be labeled, "unexplained keypoints".

A strategy of the PMP Growth Algorithm is to find coherent motions in three conceptual phases, as depicted by operational diagram 1300, including image rows 1302, 1304, 1306, and 1308, where each row includes previous image frame 1310 and current image frame 1312. The initial image row 1302 represents the images presented or received by the PMP Growth algorithm.

In Phase 1 (image row 1304), an attempt is made to find, in the current image frame 1312, instances of coherent motion objects that had been identified in the previous image frame 1310 (i.e., complete coherent motion object models or STOMs of the previous image frame). This is accomplished in one instance by bootstrapping the knowledge of STOMs 1314a, 1314b . . . 1314n, in previous image frame 1310. Arrowed lines 1316a, 1316b . . . 1316n illustrate appearance matches accomplished by this first phase of operation. Thus in Phase 1, only keypoints in the previous image frame 1310 that are part of an object (i.e., STOM) are used in the matching, whereby the groups corresponding to this concept are represented by arrow groups 1316a, 1316b. . . 1316n. This allows the PMP Growth algorithm to initially carry objects (STOMs) from the previous image frame forward into the current image frame.

At this stage in operation of the PMP Growth algorithm, keypoint 1318 and a plurality of keypoints 1320 in the current image frame 1312 have not been associated with STOMs from the previous image frame 1310. Additionally, keypoints that have been identified in the current image frame 1312 are not matched to an existing STOM in the previous image frame (e.g., locations 1322*a* and 1322*b*). It is also noted that in the processing of the previous image frame 1310 (i.e., wherein the previous image frame 1310 was being compared to an image frame that was previous to itself) a group of points 1324, were not able to be identified with any STOM, and therefore presently stand unidentified. Also, as initially observed with regard to locations 1322*a* and 1322*b*, the present method and system does not require there to be a keypoint in the previous image frame, rather the present system and method is designed such that a keypoint (i.e., see keypoints 1323*a* and 1323*b*) in the current image frame can match to a location (i.e., locations 1322*a* and 1322*b*) in the previous image frame.

In Phase 2 (image row 1306), the PMP Growth algorithm searches to find in the current image frame 1312 new objects (STOMs) that have coherent motion with unassigned keypoints (e.g., 1324) in the previous image frame 1310. In the present example this search results in keypoints 1320 and keypoints 1324 to become associated, as identified by arrow group 1326.

In Phase 3 (image row 1308), coherent motion objects with the same motion are merged to represent STOMs. For example in the current image frame 1312 STOMs 1328*a*, 1328*b* . . . 1328*n* are formed. It is also illustrated in current image frame 1312 that keypoint 1318 remains undetermined (not part of a STOM), similarly it is worth noting that locations 1322*a*, 1322*b* (not part of STOMs in the previous image frame 1310) were found in the processing of current image frame 1312 to have sufficient similarity to the other keypoints in the STOMs 1328*a* and 1328*b*, to be respectively included within those STOMs in current image frame 1312. A possible reason for this is that the movement of the locations 1322*a*, 1322*b* from one frame to the next changed sufficiently to increase its similarity scores to the relevant keypoints.

Figure 13:
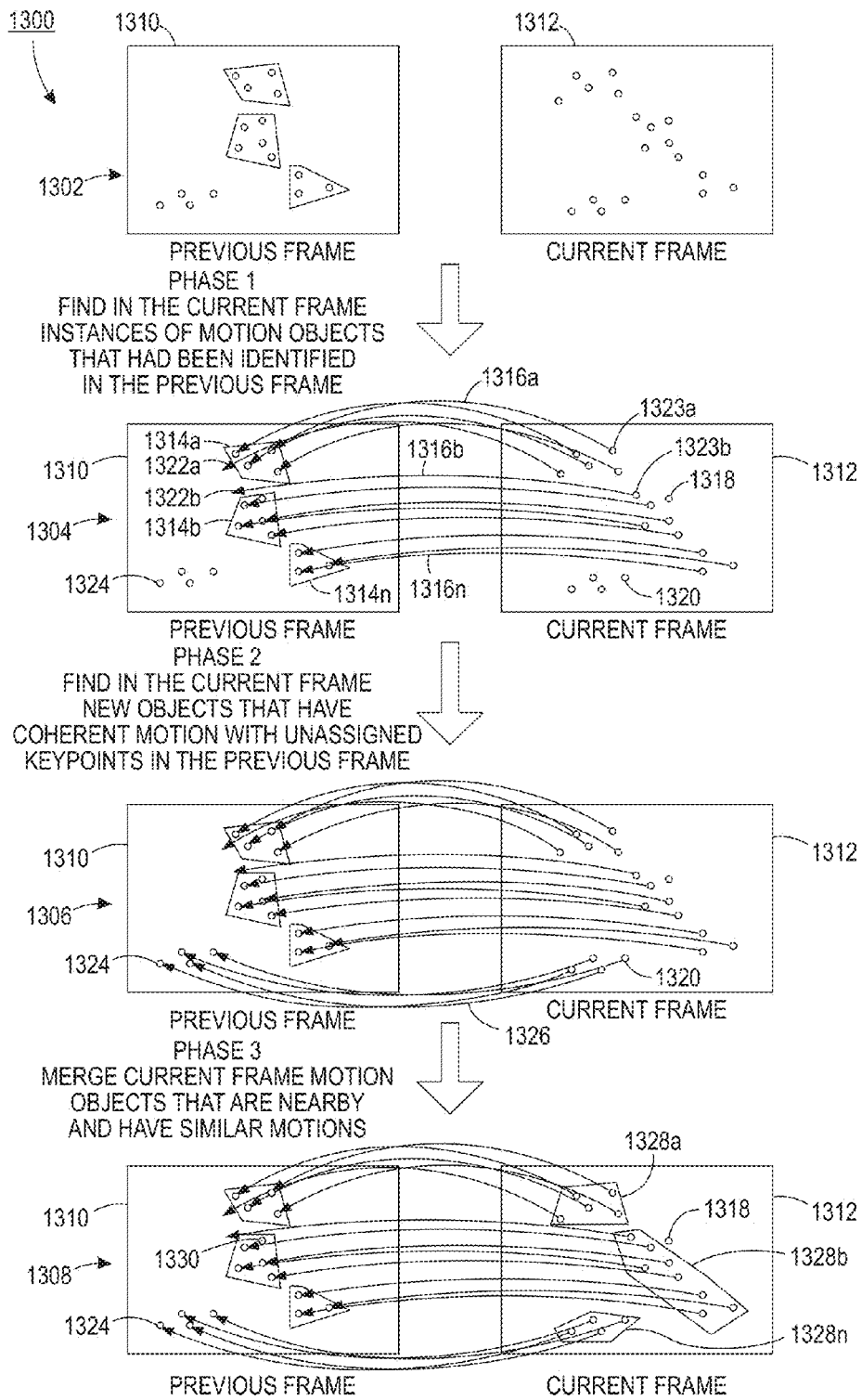
FIG. 13 illustrates three main conceptual phases of the PMP Growth Algorithm.

It can also be observed in connection with FIG. 13, that a location (keypoint) 1330 that was part of a STOM 1314*b*, in the previous image frame 1310, is not defined as being part of any STOM current image frame 1312. A possible reason for this is that while the keypoint detector (e.g., FAST) triggered on this location in the previous image frame 1310, it did not trigger to identify a keypoint in the current image frame 1312. The present discussion is set in an environment where every keypoint triggered by FAST or other feature detector process will be considered in the matching process. However in other embodiments it is possible to provide a filter eliminates some triggered keypoints from the matching process, for example the system and method may be designed to have an upper number limit of matches, after which no additional matching is allowed.

It is to be understood from the above therefore that the growth portion of the present PMP Growth algorithm proceeds in two main stages. The first stage grows seeds by accumulating clusters, and the second stage adds keypoints to the clusters in a one by one process by accumulating neighboring keypoints into the respective clusters. In this second stage the PMP Growth algorithm is no longer looking at Point-Motion-Pairs, but is rather looking to determine if there are matches to neighbor points sufficiently similar to the characteristics of the relevant seed.

The forgoing discussion provides an overview of some operational characteristics of the PMP Growth algorithm. Starting with FIG. 14 a more detailed discussion is presented of the operation of the PMP Growth algorithm PMP Growth Algorithm Details Initially, in the diagram 1400 of FIG. 14, current image frame data 1402 and state data carried over from previous frame 1404 are provided as input. The carried over state data 1404 includes a set of Similarity Transform Object Models (STOMs) and unexplained keypoints detected in the previous frame image. The STOMs each include a list of model keypoints comprising the set of image locations in the previous frame image that were ascribed to each STOM. Some of the model keypoints were found as image keypoints in the previous frame, while other model keypoints were found by local image search as described in the Grow STOMs step below.

The first operational step of the PMP Growth algorithm is to detect keypoint locations in the current frame image 1406. Any keypoint detection method can be used. The present embodiment employs the well-known FAST keypoint detection algorithm, which finds locations whose center pixel is surrounded by some ring of contiguous pixels that are either lighter or darker than the center by a threshold value.

Figure 12:
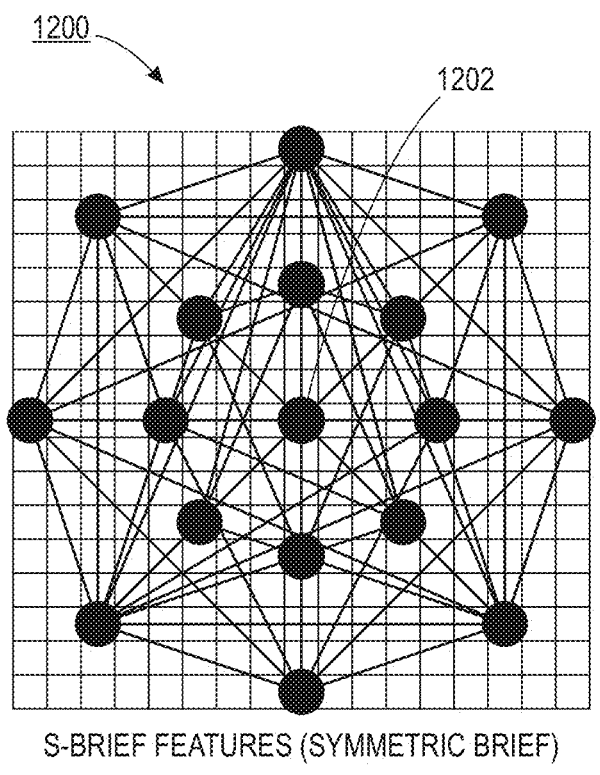
FIG. 12 represents an SBRIEF feature descriptor.

The PMP Growth algorithm exploits both geometric consistency and local appearance consistency to establish correspondences between image locations in the current and previous image frames. The next step of the PMP Growth algorithm is computing an appearance feature for each keypoint that can be compared with appearance features of keypoints and model points from the previous image frame 1408. The appearance of a local patch around each keypoint is represented as a binary feature vector describing the pattern of pixel lightnesses and/or colors in the neighborhood of the keypoint. In one embodiment a novel SBRIEF feature descriptor process is used. This SBRIEF being a variant on the BRIEF feature descriptor known and described in the computer vision literature, such as described in "BRIEF: binary robots independent elementary features", M. Colonder, V. Lepeti, C. Strecha, P. Fua, ECV 2010, hereby incorporated in its entirety by reference. The SBRIEF feature descriptor uses a particular layout pattern of sample locations with respect to the central location, as illustrated in FIG. 12. Like standard BRIEF feature descriptors, SBRIEF features can be compared quickly by computing the Hamming distance by applying a computer's Exclusive OR (XOR) operation, then summation of the number of mismatching bits. An SBRIEF Hamming distance of 0 means perfect appearance match.

A particular aspect of the PMP Growth Algorithm 1400 is forming hypotheses about constellations of neighboring keypoints that form a coherent motion object. Object hypotheses are grown from seeds, branching via neighbor relations. Neighbors of keypoints are found conveniently though the Delaunay Triangulation. Therefore, the next step of the algorithm is to perform Delaunay Triangulation on current image frame keypoints 1410, and on the model points of each of the previous image frame STOMs 1412.

Next, a catalog of appearance correspondence matches between model points of the previous frame and observed keypoint features of the current frame are generated 1414. Then using the appearance correspondence matches, Point-Motion-Pairs are formed between previous frame STOMs' model keypoints and the current image keypoints 1416. Clusters of the Point-Motion-Pairs are formed using compatible similarity transforms 1418. Then a cluster of the Point-Motion-Pairs (e.g., seed cluster) is chosen to seed the current frame STOMs 1420. Following this operation STOMs are grown (e.g., by adding additional clusters to the seed cluster) to include as many current image keypoints as possible 1422. Finally, in this first phase, consistent STOMs are merged together 1424.

Following the above steps, the PMP Growth Algorithm 1400 looks to seed new STOMs by finding consistent Point-Motion-Pair mappings between remaining image keypoints from the current image frame and keypoints that were left unexplained in the previous image frame. This procedure is similar to steps 1416-1424 discussed above.

More particularly, Delaunay Triangulation is performed to form a neighborhood graph among previous image frame unexplained keypoints 1426.

Point-Motion-Pairs are formed between neighboring pairs of previous image frame unexplained keypoints and current image frame unexplained keypoints 1428.

Point-Motion-Pairs are then clustered by compatible similarity transform 1430.

Candidate STOM seeds are then formed by accumulating sets of compatible Point-Motion-Pair clusters 1432.

These STOMs are grown to accumulate additional unexplained current image frame keypoints 1434. Then merge candidates are recorded and the merge procedure is executed among motion-compatible STOMs 1436. Thus, it is shown that motion history is used in this embodiment to establish compatibility of motion objects models for merging.

Finally, output from the PMP Growth Algorithm is the set of STOMs representing coherent motion regions between the current image frame and previous image frame, and the set of remaining unexplained keypoints of the current image frame 1438. This output may be displayed on an output device (e.g., an electronic display screen) in real time, and/or recorded for later viewing.

The following discussion will now expand on certain steps and/or concepts of the PMP Growth algorithm 1400 disclosed above.

An aspect of the PMP Growth algorithm 1400 includes two related sets of processing steps, namely proposing hypotheses and growing hypotheses for coherent object motions. These concepts employ the use of Point-Motion-Pairs.

Figure 15:
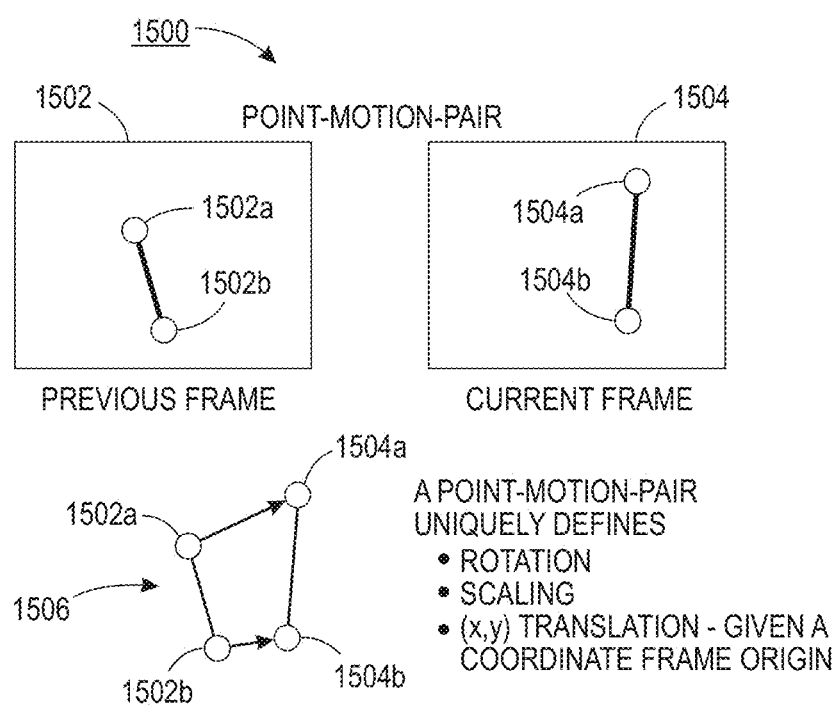
FIG. 15 illustrates the concept of a Point-Motion-Pair.

The Point-Motion-Pair (PMP) concepts of the present application are explained with reference to diagram 1500 of FIG. 15, previous image frame 1502 is shown with two points 1502a, 1502b identified and current image frame 1504 is shown with two points 1504a, 1504b identified. Most often, the points from each image frame will be Delaunay neighbors, but this is not a requirement. As shown by Point-Motion-Pair 1506, points are assigned in 1:1 correspondence. Thus FIG. 15 depicts Point-Motion-Pair 1506 as consisting of a pair of points 1502a, 1502b in previous image frame 1502 in correspondence with a pair of points 1504a, 1504b in current image frame 1504, where the correspondence defines the four parameters of a similarity transform.

A Point-Motion-Pair establishes a four degree of freedom transform of any object owning the points from a previous image frame to a current image frame. In particular, a Point-Motion-Pair determines translation, rotation, and scaling.

Coherent motion hypotheses are proposed, starting by finding sets of mutually consistent Point-Motion-Pairs. For each previous image frame model object (e.g., Similarity Transform Object Model), a set of Point-Motion-Pairs with current image keypoints is formed. This is done in three sub steps: 1. Find compatible appearance keypoints for each model point in the appearance match catalog computed previously (e.g., by a feature descriptor process such as SBRIEF); 2. Examine Delaunay Triangulation neighbor model points and their compatible image keypoints (these four points defining a Point-Motion-Pair); 3. filter out Point-Motion-Pairs that represent translation, scaling, and/or rotations, that are outside a threshold, while retaining Point-Motion-Pairs that represent translation, scaling, and/or rotations falling within the predetermined threshold limits. For example, a scaling factor outside the range, 0.1 to 10.0, is unlikely to arise from actual object motion toward or away from the camera, so a PMP scaling outside of this range would be considered to be outside the threshold and will be filtered out. It is to be understood that the thresholds for the present concepts will be different dependent on the particular intended use. Therefore it should be considered that the present system is tunable by the designer to meet the particular use.

Figure 16:
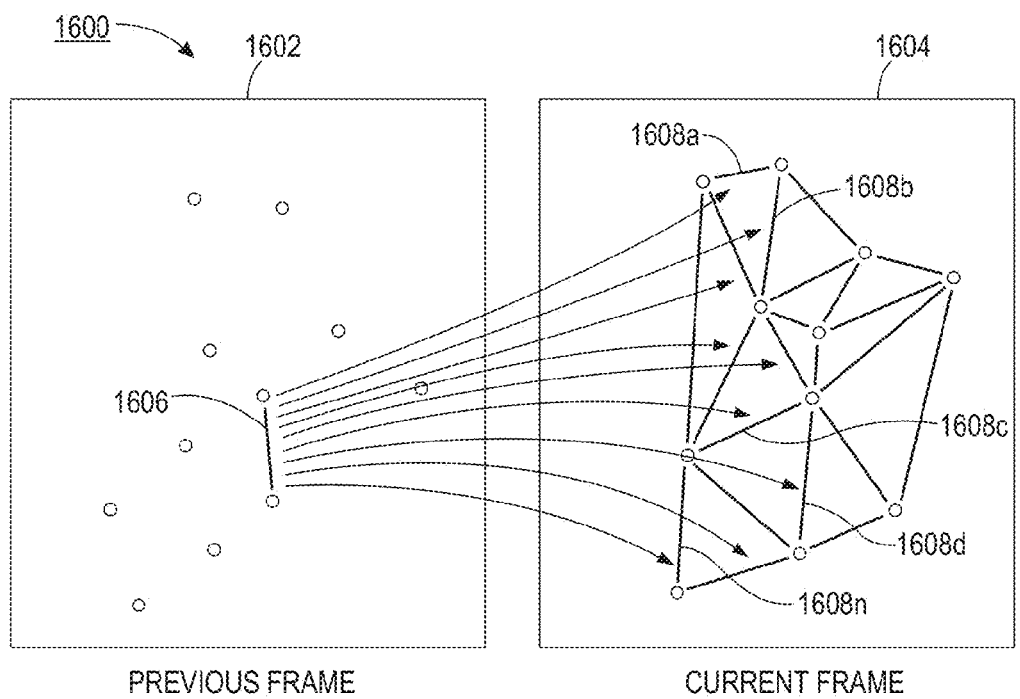
FIG. 16 illustrates that a pair of points in a Previous Image Frame generates numerous Point-Motion-Pairs by mapping to multiple pairs of points in a Current Image Frame.

FIG. 16 illustrates construction of a plurality of initial Point-Motion-Pairs. More particularly, images 1600 of FIG. 16 shows that a pair of points 1606, in a previous image frame 1602 generates numerous Point-Motion-Pairs by mapping to multiple pairs of points (e.g., 1608a, 1608b, 1608c, 1608d . . . 1608n) in the current image frame 1604. Thus it is to be appreciated that a very large number of point pairs can be formed, as for example the present figure is showing only Point-Motion-Pairs for one set of points in the previous image frame 1602, and it is clear that a plurality of other sets of points will also form Point-Motion-Pairs.

Figure 17:
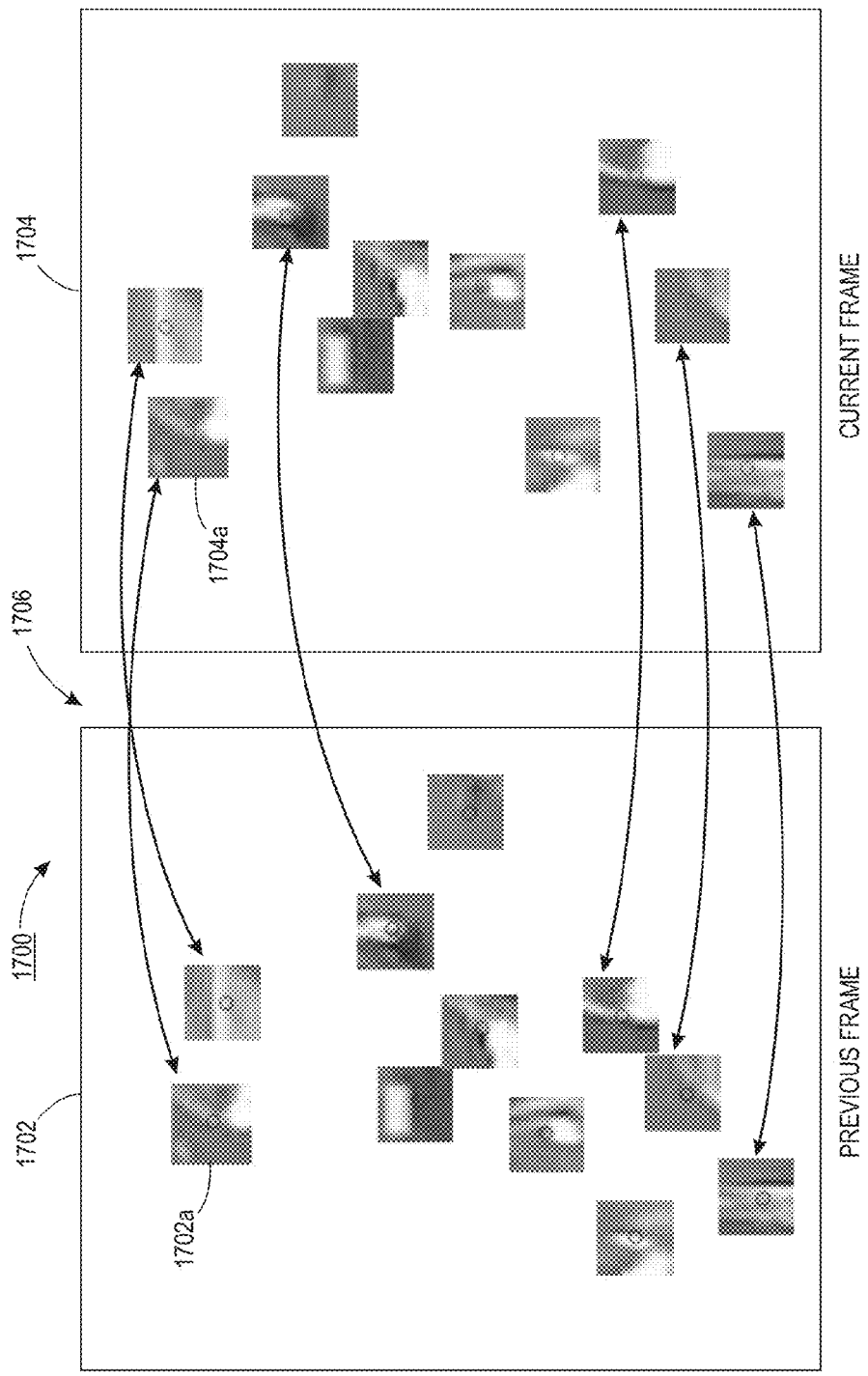
FIG. 17 Illustrates point correspondences establishing Point-Motion-Pairs are constrained by allowing only mappings between points having a local image patch appearance match.

With attention to images 1700 of FIG. 17, it is shown that point correspondences establishing Point-Motion-Pairs between a previous image frame 1702 and a current image frame 1704 are constrained by allowing only mappings between points having a local image patch appearance match (e.g., point 1702a and point 1704a each have a local image patch appearance that meet a predetermined likeness threshold that allows these points (1702a and 1704a) to be part of a Point-Match-Pair). Additional points in the previous image frame 1702 and the current image frame 1704 that have matching image patch appearances are shown as being attached via (matched) arrowed lines 1706. It is to be appreciated the above are only examples of some matching points provided for teaching purposes and not all point matches are identified.

At this time in the PMP Growth algorithm numerous Point-Motion-Pairs will have been identified, corresponding to numerous potential transforms (see FIG. 15) between pairs of model points in a previous image frame and keypoints in a current image frame.

Figure 18:
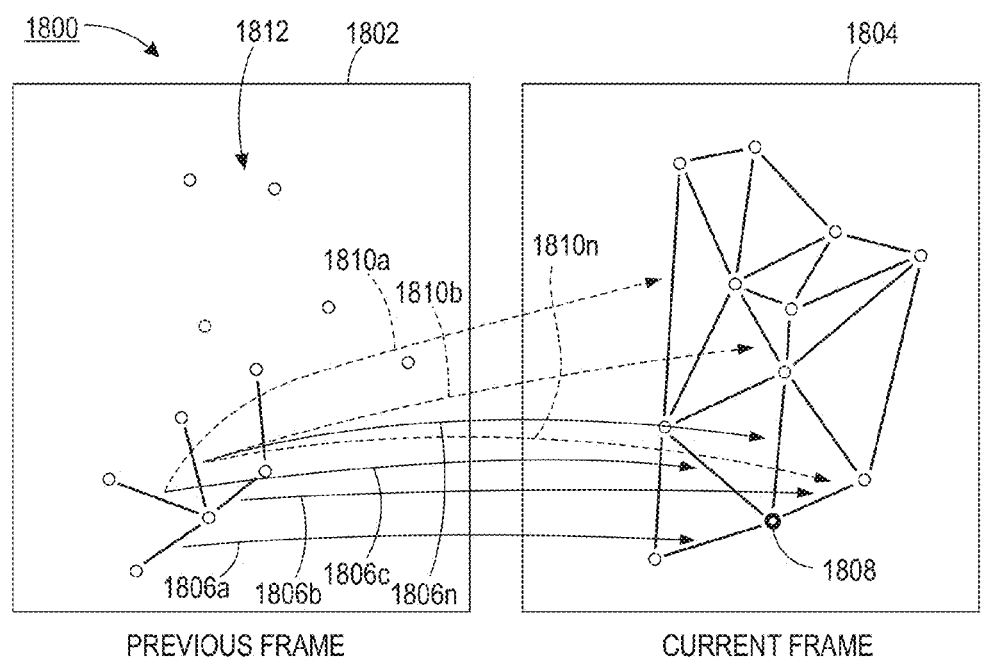
FIG. 18 illustrates a cluster of coherent Point-Motion-Pairs and other Point-Motion-Pairs that do not form a coherent cluster.

For each previous image frame model point, a list of Point-Motion-Pairs the model point participates in is compiled. Then for each image frame model point, clusters of Point-Motion-Pairs are formed based on compatibility of their translation, rotation, and scaling parameters. With attention to images 1800, including previous image frame 1802 and current image frame 1804, of FIG. 18, solid lines 1806a-1806n are used to identify Point-Motion-Pairs that form a coherent transform cluster for bolded point 1808, and the figure also shows a few other Point-Motion-Pairs that do not participate in coherent transform clusters (dashed lines) 1810a-1810n.

Following formation of Point-Motion-Pair clusters, seeds for coherent object models are formed. In particular, for each previous image frame STOM, the Point-Motion-Pair-Clusters are rank-ordered in terms of a scoring criterion. In one embodiment a score is based on number of Point-Motion-Pairs in the cluster, and the mutual compatibility of their similarity transform parameters (i.e., translation, rotation, scale). The highest scoring Point-Motion-Pair-Cluster is selected to initiate a seed. Then, other model points' Point- Motion-Pair-Clusters are added to the seed when they have sufficient similarity transform compatibility with the initial Point-Motion-Pair-Cluster. Finally a least squares transform solution is found using the set of model point to image keypoint mappings. This similarity transform defines a single similarity transform that maps model point locations in the current frame to keypoint locations in the previous frame. Any point whose mapped location exceeds a predetermined distance threshold is removed from being part of the seed set. Previous image frame STOMs form seeds in this way.

Figure 19:
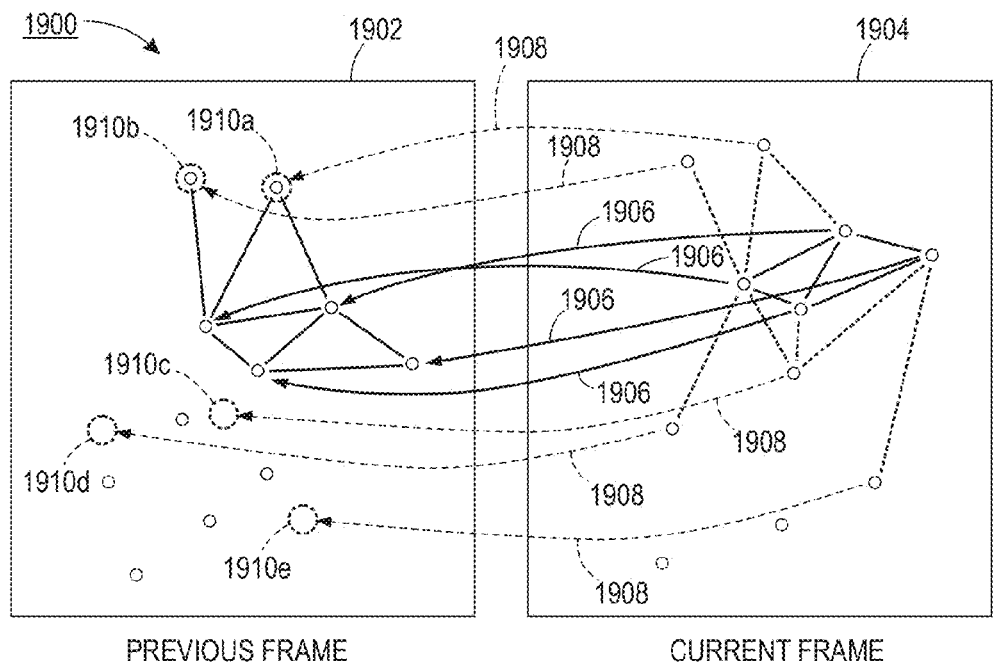
FIG. 19 illustrates established mappings between keypoints found in the current image frame and point locations in the previous frame.

In the step of growing STOMs (Step 1422 of FIG. 14), STOMs are grown in the current image frame to include as many image keypoints as possible. This concept is illustrated in images 1900 of FIG. 19, which include previous image frame 1902 and current image frame 1904. In FIG. 19 solid arrowed lines 1906 represent established mappings between keypoints found in the current image frame 1904 and point locations in the previous image frame 1902. Dashed arrows 1908 indicate neighbors of accepted keypoints in the current image frame STOM, as it is currently grown. Dashed circles 1910a-1910e show predictions of the locations these neighbor keypoints map to in the previous image frame 1902, under the current transform estimate of the STOM. Some neighbor keypoints map to well-matching locations in the previous frame (e.g., uppermost two 1910a, 1910b in this figure). These have a high probability of being accepted as part of the growing STOM]. Each STOM keeps a running estimate of its similarity transform parameters, based on averages of the transform parameters of the Point-Motion-Pairs linking its currently accepted image keypoints.

In this step the Delaunay neighbors of each image keypoint of each seed STOM are identified. A priority queue is maintained of neighbor keypoints, scored in terms of their compatibility. To compute the compatibility score, the current transform parameters are used to predict the neighbor keypoint's location in the previous frame image. Then, an appearance match is sought using the SBRIEF feature. A hill-climbing algorithm is used to find the best-matching location of the neighbor keypoint in the previous frame image, starting at the predicted location. A distance threshold is placed on how far from the initially estimated location the search is extended. If no matching location is found that exceeds a threshold SBRIEF Hamming distance, then the match is rejected. Otherwise, the matching location is placed on the priority queue which remains sorted by match score.

With continuing attention to the hill-climbing concept, for individual keypoints, while the initial operation looks at the closest similarity transform, the hill-climbing algorithm will compute a STOM for a first guess, but then will look at all neighboring locations. In other words, from the initial first estimate, the process investigates pixels within a defined pattern. While this pattern is optional, in one embodiment the hill-climbing algorithm will look at eight different locations or directions for other pixels, from the selected (centered) pixel. These additional pixel locations are also tested to determine a relationship, and are scored as to being more similar or less similar to other pixels in the tested group (included the originally-tested pixel). If one of the alternative pixel positions are determined to be a better score than the original estimated pixel position, the process shifts, making the new pixel the selected (centered) pixel, and then searching is undertaken in the same manner, e.g., eight surrounding pixel locations are searched. This process continues until the "middle" pixel is determined to have the highest score. So hill-climbing is the process of starting with an original estimated pixel, testing pixels in a pattern around that originally-estimated pixel, obtaining similarity scores for each of the pixels, and when a pixel other than the original-estimated pixel has a better score, moving and placing that pixel in the middle location and performing the process again at the newly centered pixel position. This process continuing until the centered pixel has the best score. It is understood that this best score (or highest score) refers to the situation of having the lowest Hamming distance. When the centered pixel is determined to have the best score, which may also be understood to be a local maximum. Since when looking at all directions from this position or pixel, all other scores are less than the present centered or middle pixel. This keypoint is then added to the seed. In one embodiment the hill-climbing algorithm is part of the growing of STOMs (e.g., steps 1422 and 1434) of PMP Growth flow diagram 1400.

A single priority queue is maintained for all seeds (STOMs). A reason the seeds (STOMs) are put in the same queue is because it is desired for all the objects (STOMs) to simultaneously grow as fast as possible, giving no object (STOM) a head start over any other object (STOM).

In an embodiment of the present application all the growing for all of the known objects occurs at the same time (i.e., known STOMs in the previous image frame). This is defined as having a single priority queue for all the STOMs. A reason for this is that some STOMs may want to compete for keypoints. So, for example, in FIG. 13, where there are a number of STOMs (see 1308), STOM 1328a may try to compete with STOM 1328b for keypoint 1318, to try and bring the keypoint into its seed cluster to promote that STOMs own growth. Therefore, each STOM tests the unassociated keypoint, and in one instance the STOM to which the keypoint represents a best score may absorb the keypoint (i.e., when the matching value (score) is also better than a pre-determined threshold). In another situation if both scores of the keypoint related to the STOMs are both below the threshold score neither of the STOMs would absorb the keypoint. Still further, if the keypoint has a high score (better than the threshold) for both STOMs, but the matching values (scores) are within a predetermined threshold value to one another, then the PMP Growth algorithm is designed so that neither accepted STOM tries to acquire the keypoint. It is to be understood these rules of acceptance or rejection by the STOMs, along with the precise values of the scores and thresholds are tunable and selectable on the generation of the PMP Growth algorithm and may be defined alternatively depending on proposed implementations or uses.

In one embodiment, for each seed (STOM) in the growth process, seeds will grow by accumulating the best scoring keypoints first. Therefore, different seeds will acquire (possibly) unmatched keypoints that are closest to a particular seed and these seeds may move in different directions than other seeds. An object of the growth process, in one embodiment, is to grow the seed as fast and easy as possible. Therefore, during an initial growing period the seeds will acquire keypoints that are non-competitive with other seeds. Then at a certain point the growth will enter into the aforementioned competitions for keypoints. By this time, the similarity transforms for the seeds will be better defined, making the selection more precise. Therefore, by postponing or delaying the matches that are not easiest to obtain, then the less obvious matching will be more accurate due to the improved similarity transforms.

The STOM growing procedure iterates by selecting the best matching neighbor from the priority queue and assigning it to the growing STOM that claims it, then updating the running average similarity transform parameters for that STOM. As a neighbor keypoint is accepted into the STOM, its neighbors (at least the ones that are not already members of the STOM) are explored and appearance-matched to the previous frame image. When a match is found, it is added to the priority queue according to appearance match score.

In this manner, image keypoints found in the current image frame can be matched with appropriate locations in the previous image frame even if corresponding keypoints were not found in the previous image frame. STOMs grow to accumulate Delaunay neighbor points until no neighbor points are left that predict locations in the previous frame which are compatible with coherent motions of the keypoints belonging to their respective STOMs.

The STOM growing procedure is additionally designed to discover previous frame STOMs that have very similar motions and therefore are candidates to be merged in a subsequent step. These are found when an image keypoint is a neighbor to more than one growing STOM, and is found to be compatible with the similarity transforms of both STOMs. A list of candidate STOMs to merge is thereby prepared by the STOM growing procedure.

The STOM growing procedure exits when the priority queue is emptied of neighbor keypoints making predictions about corresponding locations in the previous frame image.

Figure 14:
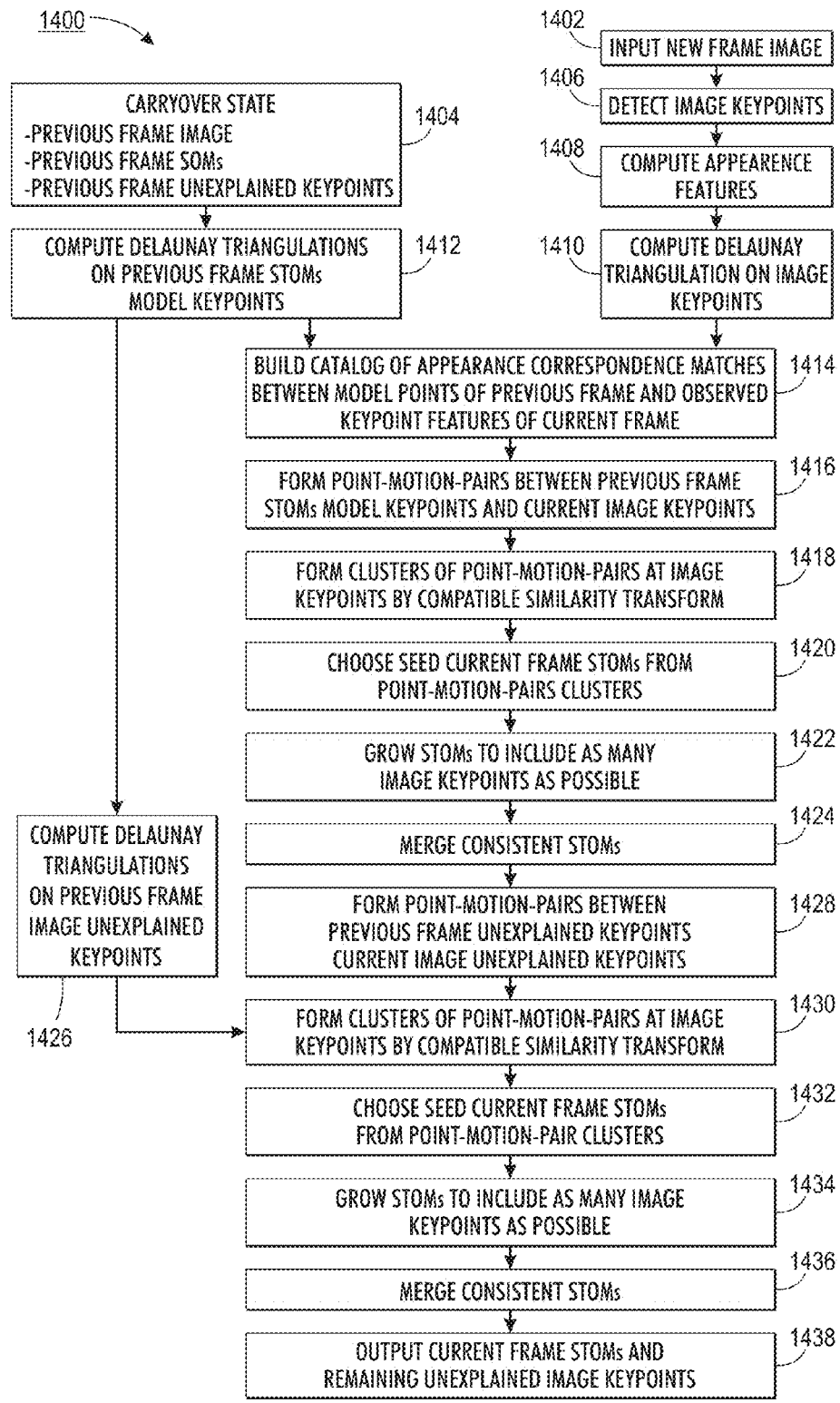
FIG. 14 is a detailed flowchart of the PMP Growth Algorithm.

The discussion will now expand on step 1424 of FIG. 14, where the candidate STOMs are merged. In this step hypothesized current image frame STOMs are sorted in order of descending number of member keypoints. Starting with the largest STOM, each STOM is considered as the base for merging with other subsidiary STOMs as suggested by the grow procedure. First, the transform parameters for each STOM are found by least-squares fit. Then a three-part criterion is used to determine whether each subsidiary STOM should be merged with the base STOM. The first part requires that the transform parameters of the base and subsidiary STOMs be roughly the same (the particular tolerances, including those for differences between the base and subsidiary STOMs being selected or tuned during the set-up/implementation of the PMP Growth algorithm). The second part requires that the transform parameters of the base STOM predict the location of the subsidiary STOM's centroid in the previous frame to within a threshold tolerance. The third part examines the motion trajectories of the base and subsidiary STOMs in some number of frames previous to the current image frame. The number of historical image frames (those prior in sequence to the current image frame, and including the discussed previous image frame and those previous thereto) considered is the minimum of a predetermined number (in one embodiment 20 historical image frames are used, although other values may be used) and the minimum of the historical ages of the two STOMs in terms of number of frames since they were first created. If the relative orientation and scale of the base and subsidiary STOMs are consistent with their respective transform parameters, then the STOMs may be merged. Once a subsidiary STOM is merged with a base STOM, that subsidiary STOM is removed from consideration for additional merges. Then the process will rank the remaining STOMS and select the largest remaining STOM as a next seed and the process continues, until no remaining STOMs are able to be merged and/or no STOMS remain to be a seed.

The PMP Growth Algorithm up to this point will produce some number of current image frame STOMs that were spawned by previous image frame STOMs. These STOMs will consume, or explain, some number of the current image frame detected keypoints. There may remain some current image frame keypoints that do not belong to, or are not explained by current imager frame STOMs. Indeed, when the PMP Growth Algorithm first starts running, the initial previous image frame will be blank and there will have been no previous image frame STOMs to propagate forward, so all of the previous image frame keypoints will be unexplained.

As mentioned above, the output of the PMP Growth Algorithm is the set of STOMs representing coherent motion regions between the current frame image and previous frame image, and the set of remaining unexplained keypoints of the current frame image.

Figure 20:
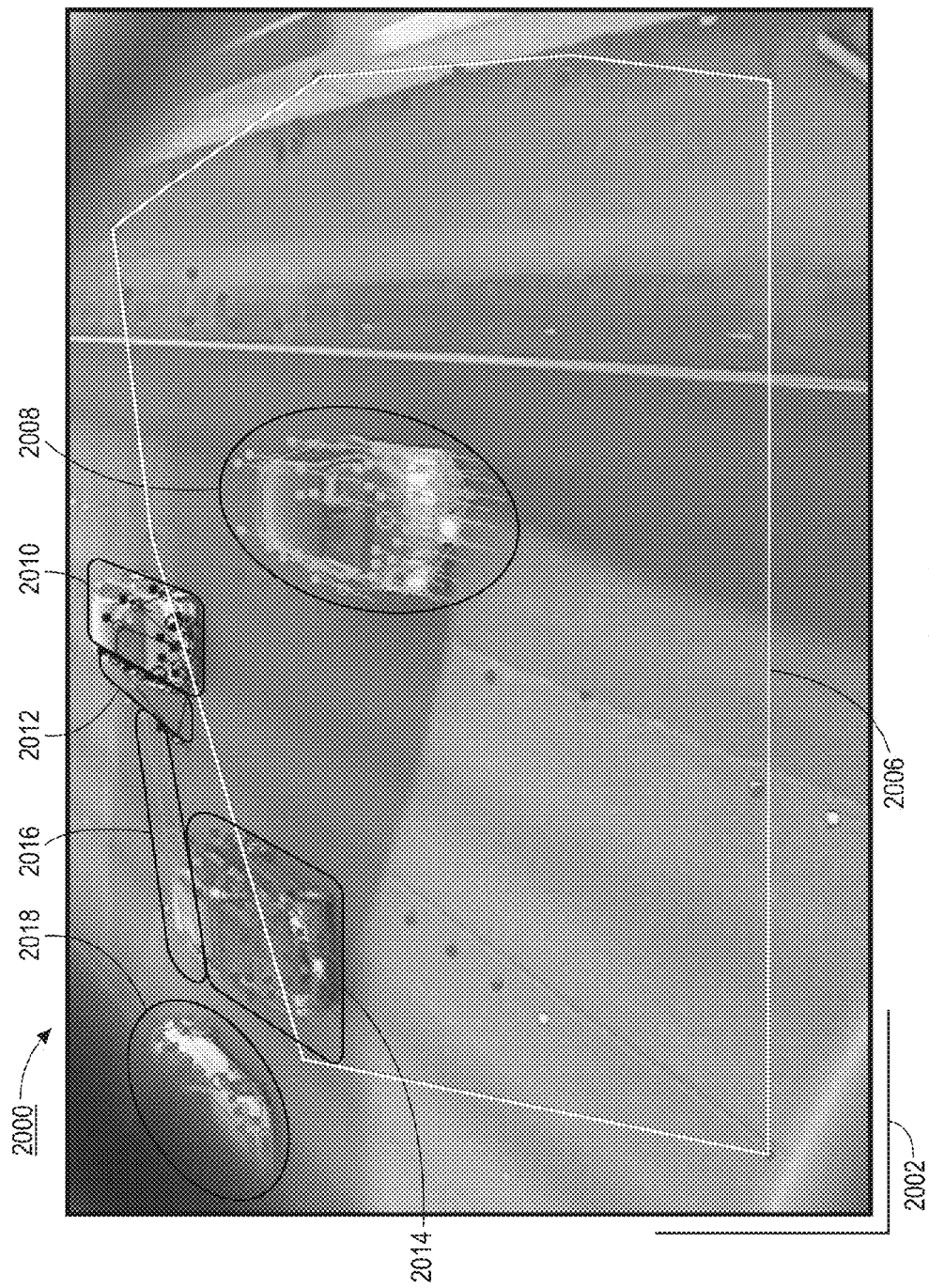
FIG. 20 presents a frame from a video of a freeway scene, where multiple STOMs have been identified.

FIG. 20 presents a frame from a video 2000 shown on a output display 2002 of a freeway scene which has been processed by the PMP Growth algorithm 1400. At this moment, the PMP Growth algorithm has discovered and is tracking seven STOMs. These include a first STOM having solid circles within the outlined area 2006, representing portions of the roadway. A second STOM 2008 represents an image of a car in the middle right side of the image. A third STOM 2010 represents an image of another car, located in the middle back portion of the image. A fourth STOM 2012 represents a portion of the car in the back middle of the image as well as a portion of the roadway. A fifth STOM 2014 represents an upper section of another car on the roadway, with a sixth STOM 2016 representing a back portion of the same car and a portion of the roadway. Finally, a seventh STOM 2018 represents a left most car (only partially viewable in the image). STOMS 2010 and 2012 share responsibility for a moving object and will be merged in a subsequent frame.

The PMP Growth algorithm described herein therefore provides for image tracking and processing that is operative when the camera system moves around a great deal, i.e., causing image jumps from one image frame to the next. It also is operative in systems where the objects themselves are making quick movements that alter their path. These attributes allow tracking systems using the PMP Growth algorithm to follow objects a long distance in a scene. The forgoing discussion may be designed to use the current image frame and the immediately previous image frame in a sequence. However, in other embodiments the PMP Growth method and system may be designed to use an image frame other than the immediate previous frame. For example the system and method may be designed to use the $10^{th}$, $15^{th}$, $150^{th}$, $1000^{th}$, etc. frame that is previous to the current frame.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claim

What is claimed is:

1. A method for measuring ground vehicle speed comprising:

positioning an unmanned aerial vehicle (UAV) in proximity to a roadway, the UAV flying under control and navigation of a UAV control unit, and further carrying camera and monitoring equipment, the camera and monitoring equipment including an onboard computing system, and a camera with a wide angle lens and a camera with a telephoto lens, the cameras mounted on a pan/tilt device;

using a computer vision algorithm to detect vehicles moving on a roadway despite motion created by movement of the UAV, wherein the computer vision algorithm is operated by the on-board computing system;

moving the cameras mounted on the pan/tilt device under the direction of the computer vision algorithm to maintain a target vehicle of the detected moving vehicles in view; and measuring a speed of the target vehicle,
wherein the UAV control unit uses Global Positioning System (GPS) coordinates and camera geometry, altitude, and location of the target vehicle in the image to measure the target vehicle speed.

2. The method according to claim 1 wherein the computer vision algorithm automatically selects the target vehicle to track.

3. The method according to claim 2 wherein the tracking of the target vehicle is by active control of the pan/tilt device holding the cameras.

4. The method according to claim 1 wherein the cameras are approximately axis-aligned cameras, wherein the camera with the wide angle lens is used to track the target vehicle and the camera with the telephoto lens is used to capture a high resolution snapshot while the target vehicle is centered in the wide angle image frame.

5. The method according to claim 1 wherein a timing of the target vehicle passing locally calibrated landmarks is used to measure the target vehicle speed.

6. The method according to claim 1 wherein the computer vision algorithm tracks a vehicle by detecting the vehicle in every camera image while the vehicle is within a view of the camera with the wide angle lens.

7. The method according to claim 1 wherein the computer vision algorithm employs Point-Motion-Pairs to establish correspondences among keypoint features of vehicles.

8. A method for measuring ground vehicle speed comprising:
positioning an unmanned aerial vehicle (UAV) in proximity to a roadway, the UAV flying under control and navigation of a UAV control unit, and further carrying camera and monitoring equipment, the camera and monitoring equipment including an onboard computing system, and a camera with a wide angle lens and a camera with a telephoto lens, the cameras mounted on a pan/tilt device;
using a computer vision algorithm to detect vehicles moving on a roadway despite motion created by movement of the UAV, wherein the computer vision algorithm is operated by the on-board computing system;
moving the cameras mounted on the pan/tilt device under the direction of the computer vision algorithm to maintain a target vehicle of the detected moving vehicles in view; and
measuring a speed of the target vehicle, including following the target vehicle for at least a kilometer or half a minute to measure the vehicle's speed by a distance the UAV has travelled as measured by a Global Positioning System (GPS).

9. A method for detecting, tracking and estimating speeds of vehicles on a roadway, the method comprising:
positioning an unmanned aerial vehicle (UAV) in proximity to a roadway, the UAV flying under control and navigation of a UAV control unit, and further carrying camera and monitoring equipment, the camera and monitoring equipment including an onboard computing system, and a camera with a wide angle lens and a camera with a telephoto lens, the cameras mounted on a pan/tilt device;
directing the pan/tilt controlled cameras to view the roadway; and
engaging a moving vehicle monitoring procedure which includes:
detecting moving vehicles from a video feed of the camera with the wide-angle-lens;
estimating vehicle speed for each moving vehicle in the video feed;
determining a target vehicle to continue to track from among the vehicles in the video feed;
tracking the target vehicle;
recording video evidence of the target vehicle by the camera with the wide-angle lens;
serving the pan/tilt device to center the target vehicle in the frame of the video feed;
measuring the target vehicle speed;
taking a zoomed-in snapshot of the target vehicle license plate with the camera with the telephoto lens when the target vehicle license plate is centered in the frame of the camera with the wide angle lens; and
recording the target vehicle license plate when it is determined the target vehicle license plate is readable and that sufficient speed evidence of the target vehicle has been collected.

10. The method of claim 9 wherein the tracking algorithm is a computer vision algorithm.

11. The method of claim 10 wherein the computer vision algorithm detects moving vehicles despite motion created by movement of the UAV.

12. The method according to claim 9 wherein the computer vision algorithm automatically picks out the target vehicle to track 13. The method according to claim 9 wherein the tracking of the target vehicle is by active control of the pan tilt controlled cameras.

14. The method according to claim 9 wherein the cameras are arranged as approximately axis-aligned cameras on the pan/tilt device mounted on the UAV to obtain high-resolution images of vehicles from the camera with the telephoto lens while guiding the pan/tilt device under visual tracking control of the camera with the wide angle lens.

15. The method according to claim 9 wherein the UAV is used to measure the speed of a ground vehicle by use of Global Positioning System (GPS) coordinates of the aircraft and the geometry of direction of a pan/tilt controlled cameras while maintaining visual tracking of the vehicle.

16. A speed measurement system to detect, track and determine a speed of a vehicle on a roadway, the system comprising:
an unmanned aerial vehicle (UAV);
a UAV control unit positioned on the UAV and configured to control the operation and navigation of the UAV;
a camera and monitoring system carried on the UAV and controlled by the UAV control unit, and including:
a camera with a wide angle lens and a camera with a telephoto lens, the cameras mounted on a pan/tilt device connected to the UAV by a mounting bracket, and
an on-board computing system configured to operate a moving vehicle monitoring procedure (MVMP) which includes a tracking algorithm that actively controls movement of the pan/tilt device, to coordinate movement of the camera with the wide angle lens and the camera with the telephoto lens to obtain an image of a license plate from a target vehicle being tracked by the MVMP procedure and to determine a speed of the target vehicle,
wherein the UAV control uses Global Positioning System (GPS) coordinates and camera geometry, altitude, and location of the target vehicle in the image to measure the target vehicle speed.

17. The system according to claim 16 wherein the cameras are used as approximately axis-aligned cameras on a pan/tilt device mounted on the UAV to obtain high-resolution images of vehicles from the camera with the telephoto lens while guiding the pan/tilt device under visual tracking control of the camera of the wide angle lens.

18. The system according to claim 16 wherein the MVMP includes a computer vision algorithm used to detect moving vehicles on a roadway despite motion created by movement of the UAV, wherein the computer vision algorithm is operated by the on-board computing system.

19. The system according to claim 18 wherein the computer vision algorithm is configured to automatically select the target vehicle to track.

* * * * *